United States Patent [19]

Smitt

[11] Patent Number: 4,564,900
[45] Date of Patent: Jan. 14, 1986

[54] MULTIPROCESSOR COMPUTER SYSTEM

[75] Inventor: Asbjørn Smitt, Vedbaek, Denmark

[73] Assignee: Christian Rovsing A/S, Ballerup, Denmark

[21] Appl. No.: 579,435

[22] Filed: Feb. 10, 1984

Related U.S. Application Data

[63] Continuation of Ser. No. 303,514, Sep. 18, 1981, abandoned.

[51] Int. Cl.$^4$ ............................................. G06F 13/00
[52] U.S. Cl. ..................................................... 364/200
[58] Field of Search ... 364/200 MS File, 900 MS File; 371/9, 11

[56]          References Cited
        U.S. PATENT DOCUMENTS

| | | | |
|---|---|---|---|
| 3,300,764 | 1/1967 | Doelz et al. | 364/200 |
| 3,411,139 | 11/1968 | Lynch et al. | 364/200 |
| 3,413,613 | 11/1968 | Bahrs et al. | 364/200 |
| 3,419,849 | 12/1968 | Anderson | 364/200 |
| 3,480,914 | 11/1969 | Schlaeppi | 364/200 |
| 3,588,831 | 6/1971 | Figueroa | 364/200 |
| 3,634,830 | 1/1972 | Baskia | 364/200 |
| 3,641,505 | 2/1972 | Artz et al. | 364/200 |
| 3,648,252 | 3/1972 | Thron et al. | 364/200 |
| 3,692,989 | 9/1972 | Kandiew | 364/200 |
| 3,710,349 | 1/1973 | Miwa | 364/200 |
| 3,716,838 | 2/1973 | Beard | 364/200 |
| 3,768,074 | 10/1973 | Sharp et al. | 364/200 |
| 3,820,079 | 6/1974 | Bergih et al. | 364/200 |
| 3,828,321 | 8/1974 | Wilber et al. | 364/200 |
| 3,886,524 | 5/1975 | Appelt | 364/200 |
| 3,889,237 | 6/1975 | Alferness et al. | 364/200 |
| 3,905,023 | 9/1975 | Perpiglia | 364/200 |
| 3,905,023 | 9/1975 | Periiglia | 364/200 |
| 3,976,977 | 8/1976 | Porter et al. | 364/200 |
| 3,976,977 | 8/1976 | Porter et al. | 364/200 |
| 4,001,790 | 1/1977 | Barlow | 364/200 |
| 4,010,450 | 3/1977 | Porter et al. | 364/200 |
| 4,015,243 | 3/1977 | Kuranek | 364/200 |
| 4,032,899 | 6/1977 | Jenny et al. | 364/200 |
| 4,034,347 | 7/1977 | Probert, Jr. | 364/200 |
| 4,035,777 | 7/1977 | Moreton | 364/200 |
| 4,040,028 | 8/1977 | Pauker et al. | 364/200 |
| 4,041,472 | 8/1977 | Shah et al. | 364/200 |
| 4,067,059 | 1/1978 | Derchak | 364/200 |
| 4,099,233 | 7/1978 | Barbagelata | 364/200 |
| 4,099,234 | 7/1978 | Woods et al. | 364/200 |
| 4,123,794 | 10/1978 | Matsumoto | 364/200 |
| 4,130,865 | 12/1978 | Heart et al. | 364/200 |
| 4,141,066 | 2/1979 | Keiles | 364/200 |
| 4,161,024 | 7/1979 | Joyce | 364/200 |
| 4,181,974 | 1/1980 | Lemay | 364/200 |

(List continued on next page.)

Primary Examiner—James D. Thomas
Assistant Examiner—David Y. Eng
Attorney, Agent, or Firm—Fleit, Jacobson, Cohn & Price

[57]          ABSTRACT

A multiprocessor computer system wherein memory buses of separate central processing unit systems are interfaced to an intermemory communication network for transfer of data between memories of said separate central processing unit systems.

The intermemory communication network includes a plurality of preferably passive intermemory communication links being tapped for connection to link adapters interfacing a number of central processing unit systems to each intermemory communication link. The number of central processing unit systems may be different for different intermemory communication links.

The memory buses are configured to allow for direct data transfer between any memory fraction of a common memory shared by at least two central processing unit systems without interfering with the central processing units such that the data transfer is controlled by direct memory access control means.

The multiprocessor computer system includes separate configuration controllers being effective to reconfigurate the overall system in the event of failure. The reconfiguration comprises switching of fractions of memory between the memory buses of at least two central processing unit systems. At least one of the memory fractions is directly addressable by a respective peripheral processor. Also, one of the peripheral processors backs up the others to obtain N+1 redundancy.

30 Claims, 24 Drawing Figures

U.S. PATENT DOCUMENTS

| | | | |
|---|---|---|---|
| 4,195,344 | 3/1980 | Yamazaki | 364/200 |
| 4,214,305 | 7/1980 | Tokita et al. | 364/200 |
| 4,219,873 | 8/1980 | Kober et al. | 364/200 |
| 4,228,496 | 10/1980 | Katzman | 364/200 |
| 4,228,503 | 10/1980 | Waite et al. | 364/200 |
| 4,231,086 | 10/1980 | Tarbox et al. | 364/200 |
| 4,232,366 | 11/1980 | Levy et al. | 364/200 |
| 4,234,919 | 11/1980 | Bruce et al. | 364/200 |
| 4,237,534 | 12/1980 | Felix | 364/200 |
| 4,240,143 | 12/1980 | Besemer | 364/200 |
| 4,245,305 | 1/1981 | Gechele | 364/200 |
| 4,249,239 | 2/1981 | Mescam et al. | 364/200 |
| 4,253,144 | 2/1981 | Bellamy | 364/200 |
| 4,257,099 | 3/1981 | Appelt | 364/200 |
| 4,261,035 | 4/1981 | Raymond | 364/200 |
| 4,263,650 | 4/1981 | Bennett et al. | 364/200 |
| 4,270,167 | 5/1981 | Koehler et al. | 364/200 |
| 4,270,168 | 5/1981 | Murphy et al. | 364/200 |
| 4,271,465 | 6/1981 | Ohtsuka | 364/200 |
| 4,272,819 | 6/1981 | Katsumata et al. | 364/200 |
| 4,276,594 | 6/1981 | Morley | 364/200 |
| 4,295,192 | 10/1981 | Porcella | 364/200 |
| 4,296,465 | 10/1981 | Lemak | 364/200 |
| 4,296,466 | 10/1981 | Guyer et al. | 364/200 |
| 4,342,083 | 7/1982 | Freedman | 364/200 |

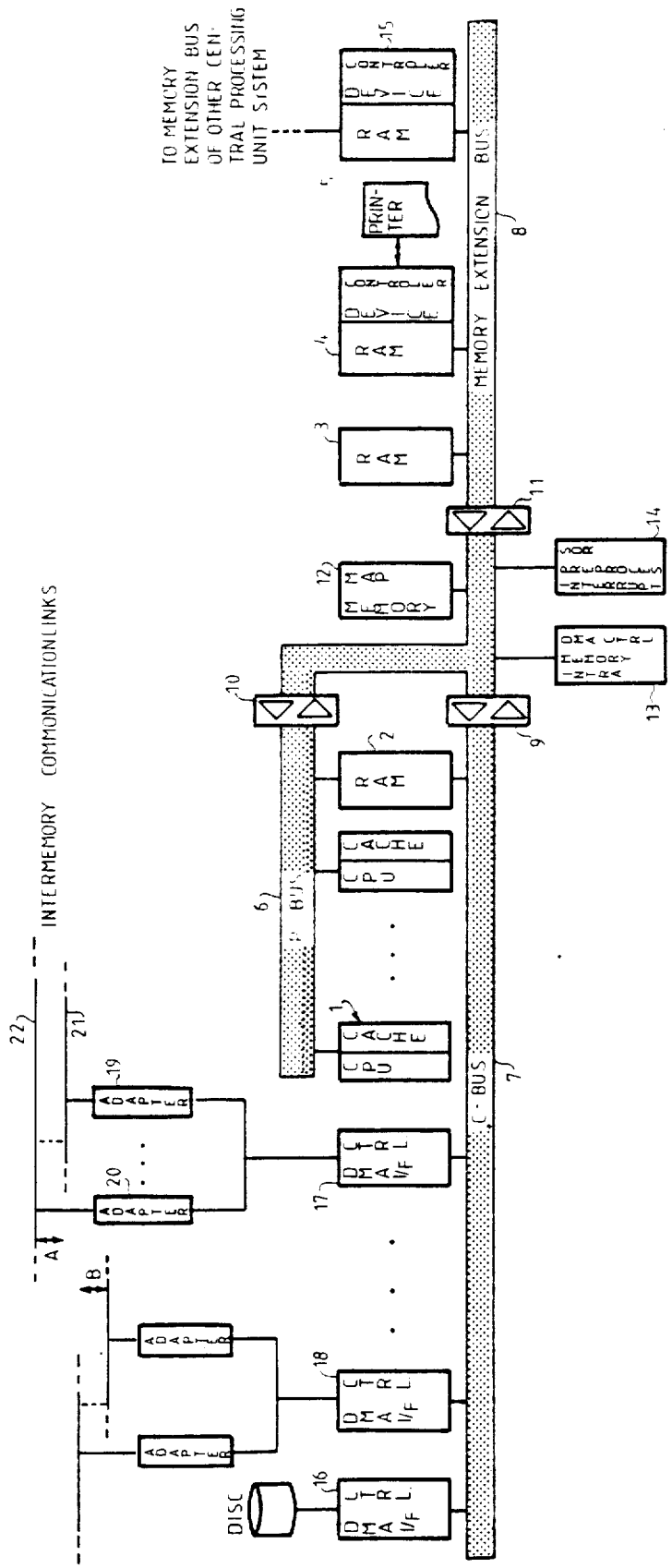
Fig. 2 Central Processing Unit System/Adapter

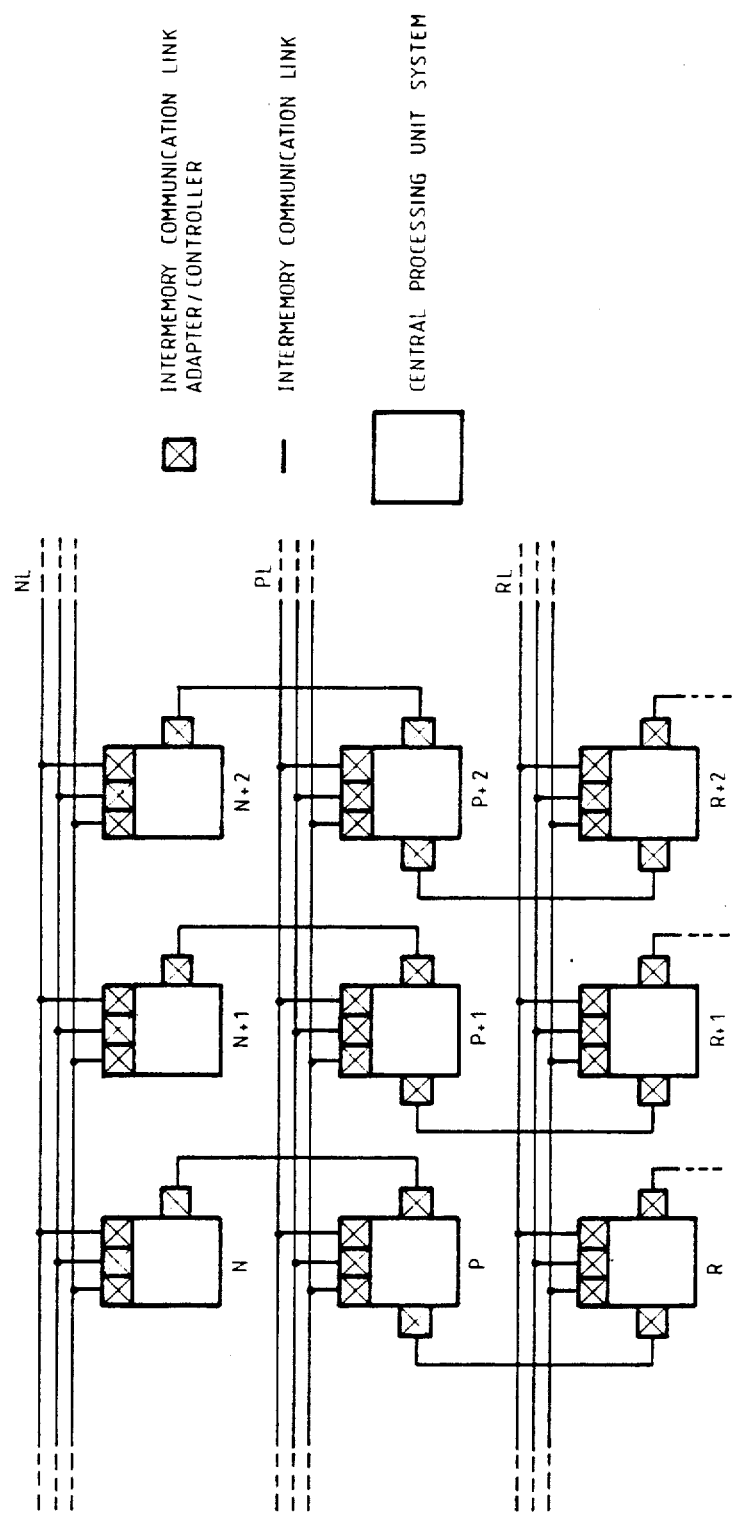
Fig. 3 Intermemory Communication Network

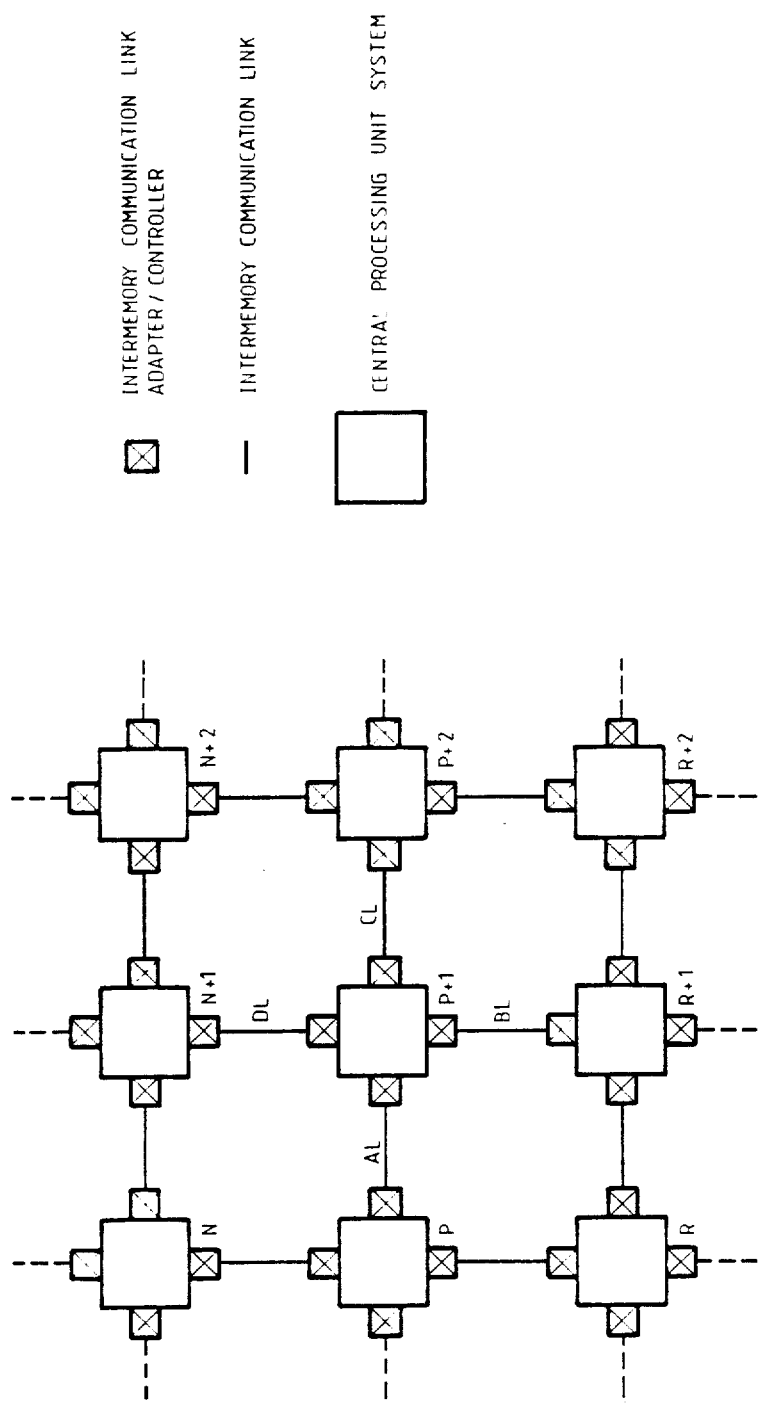
Fig. 4 Intermemory Communication Network

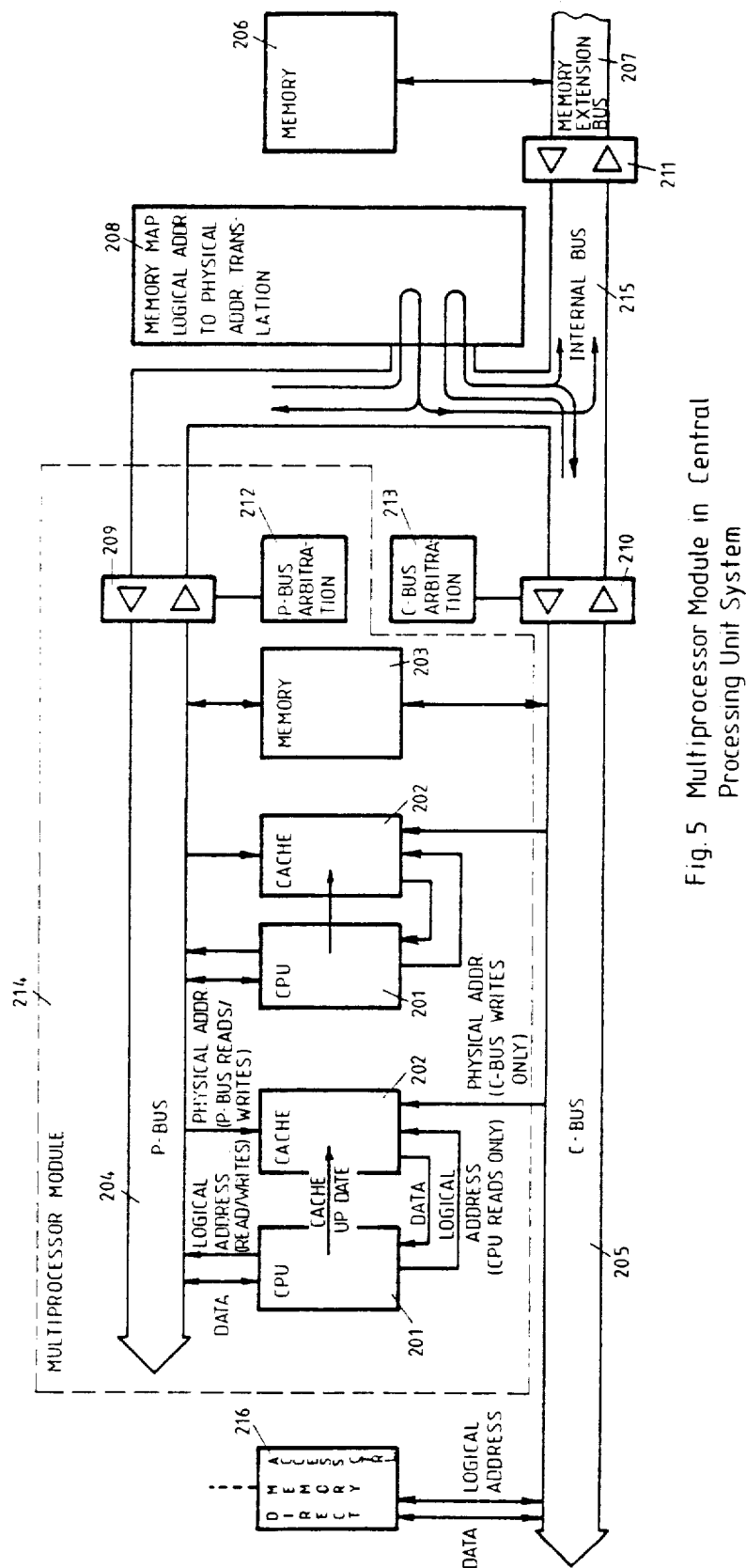
Fig. 5 Multiprocessor Module in Central Processing Unit System

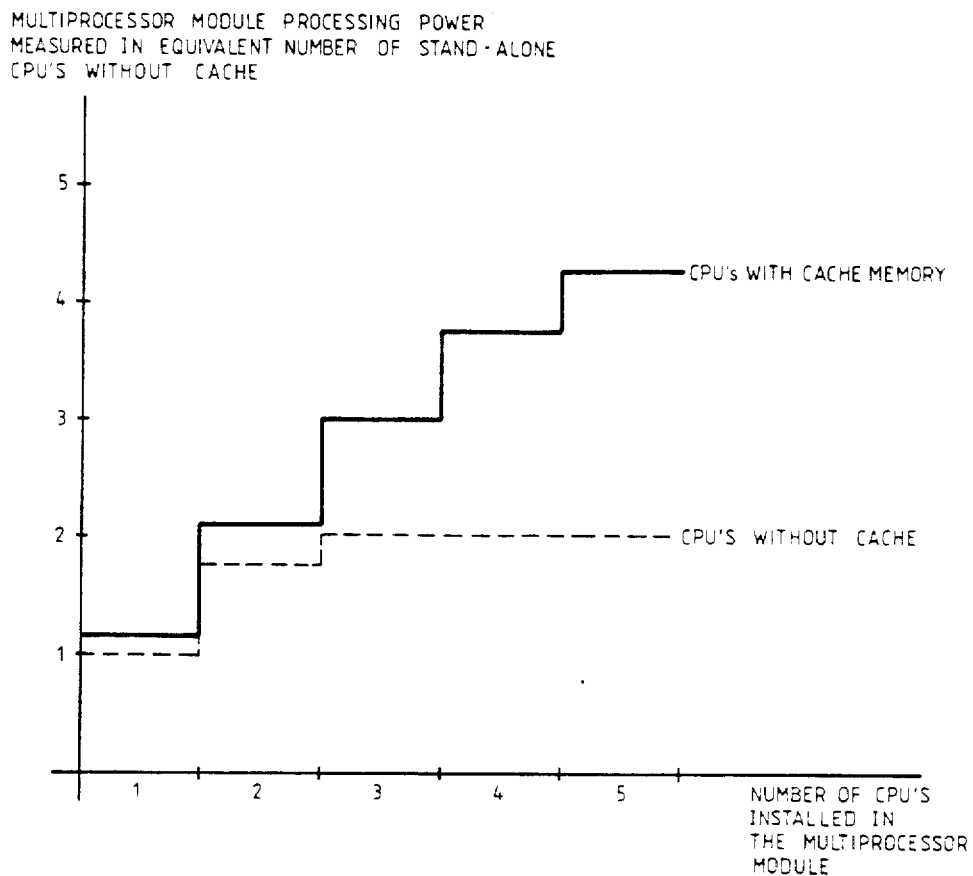
Fig. 6 Multiprocessor Module Performance using CPU's with CACHE Memory

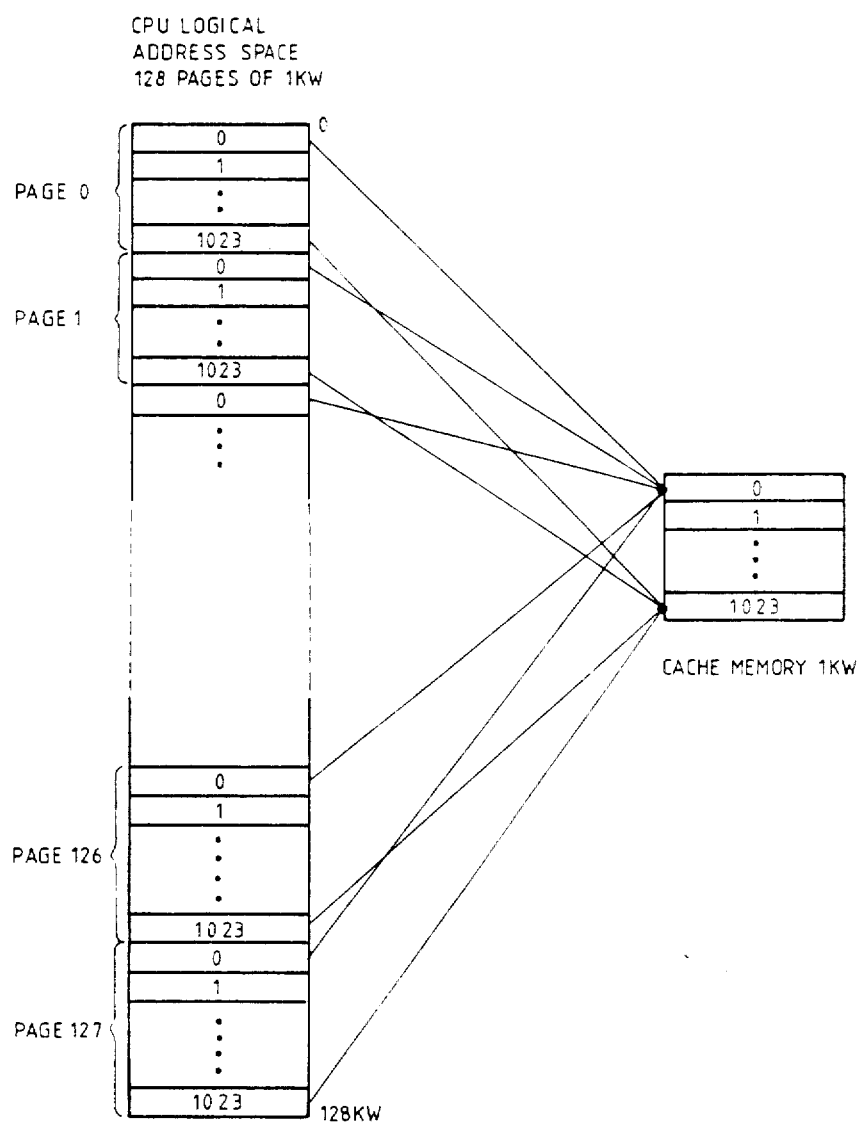
Fig. 7 Many to be one correspondence principle of Cache Memory

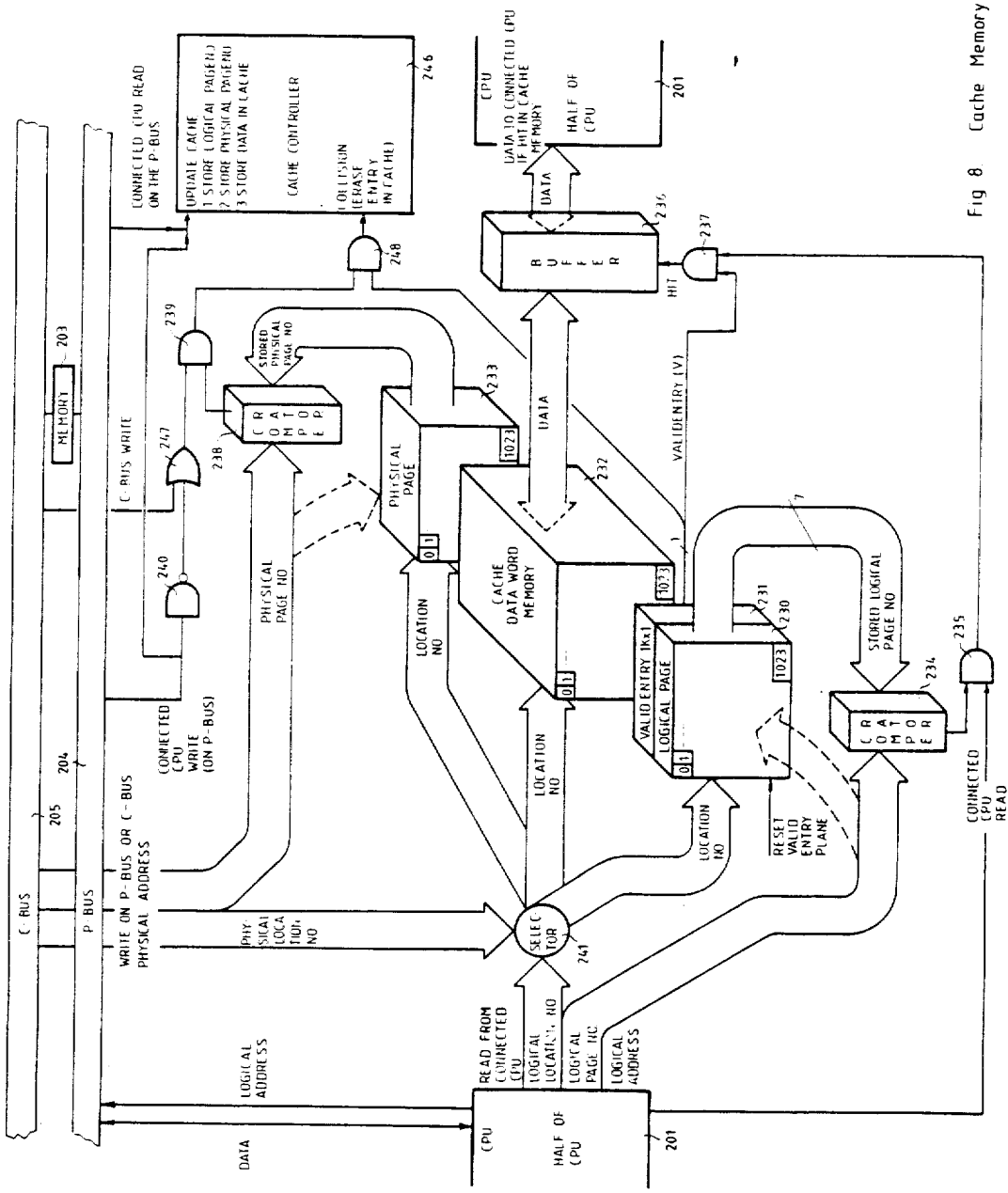
Fig 8  Cache Memory

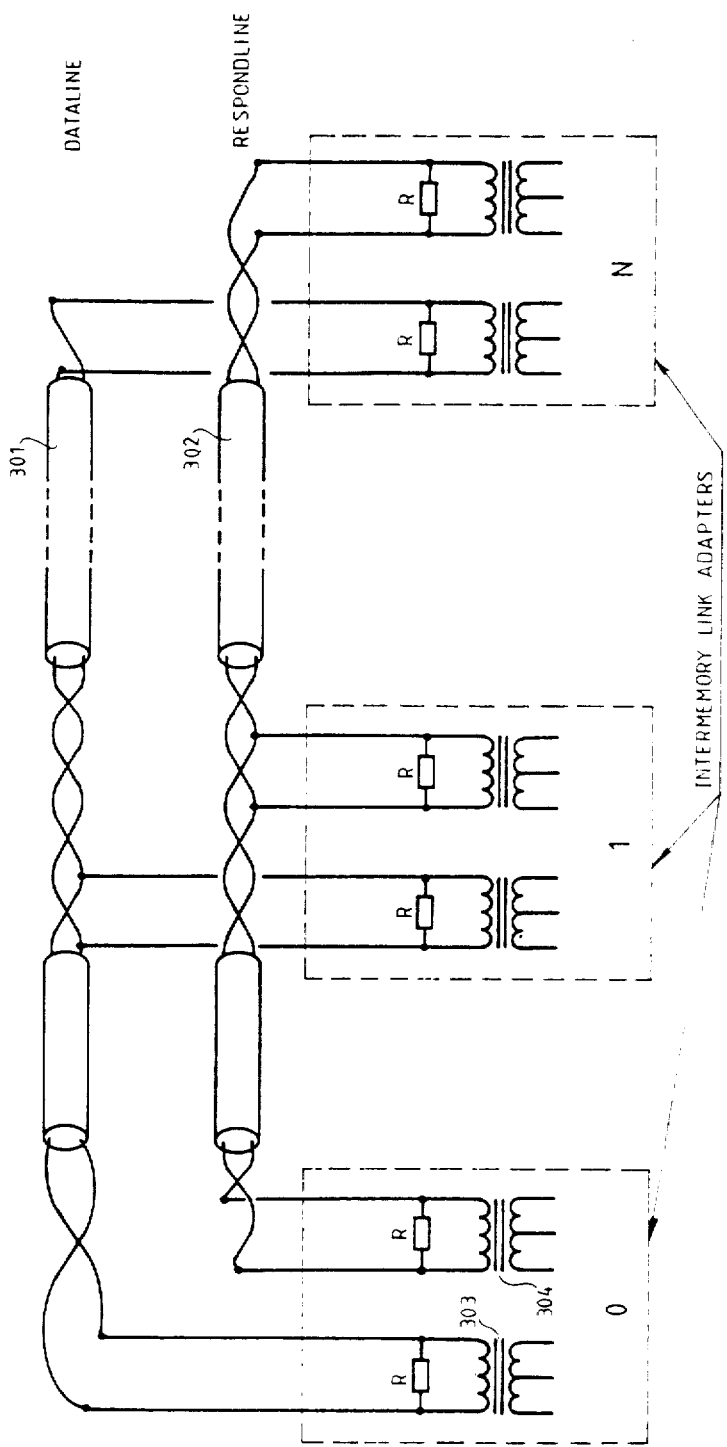
Fig. 9 Intermemory Communication Link

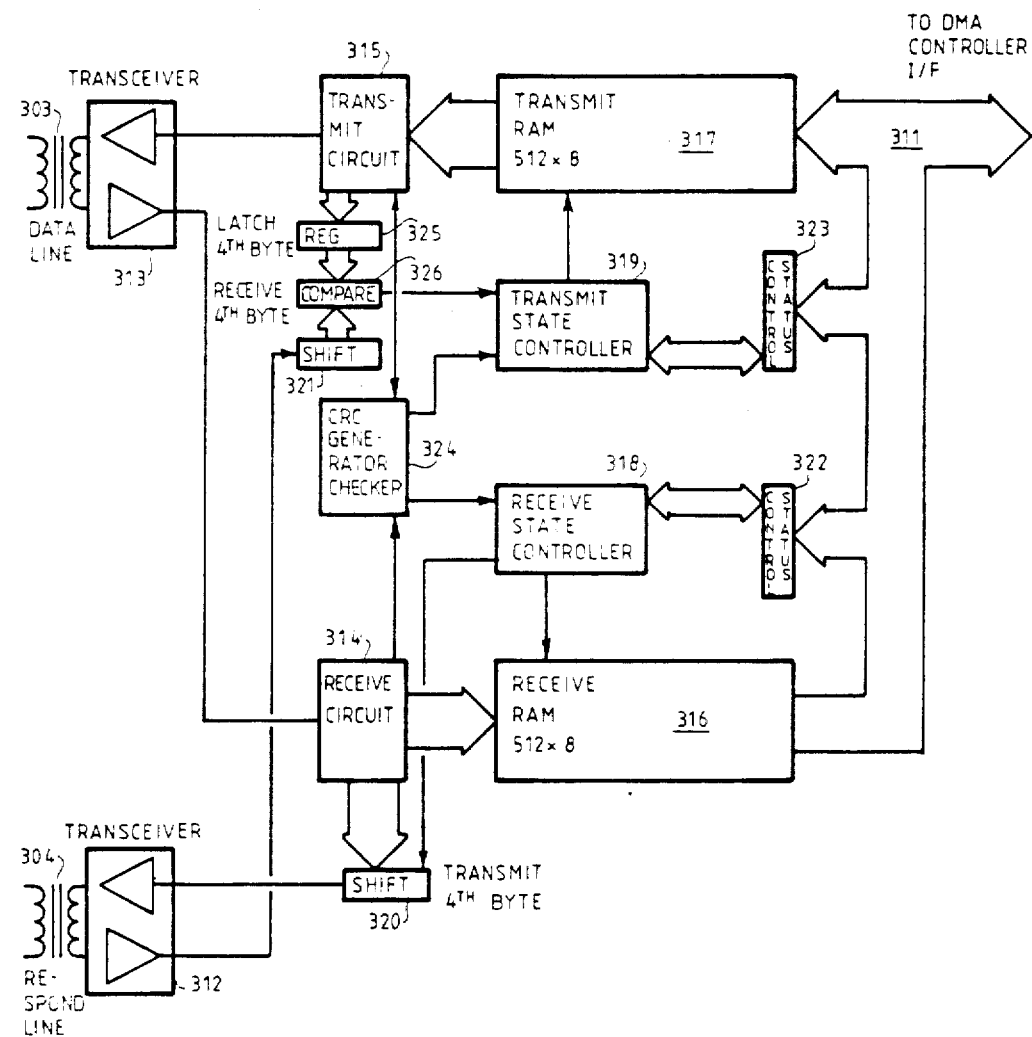
Fig.10 Intermemory Link Adapter

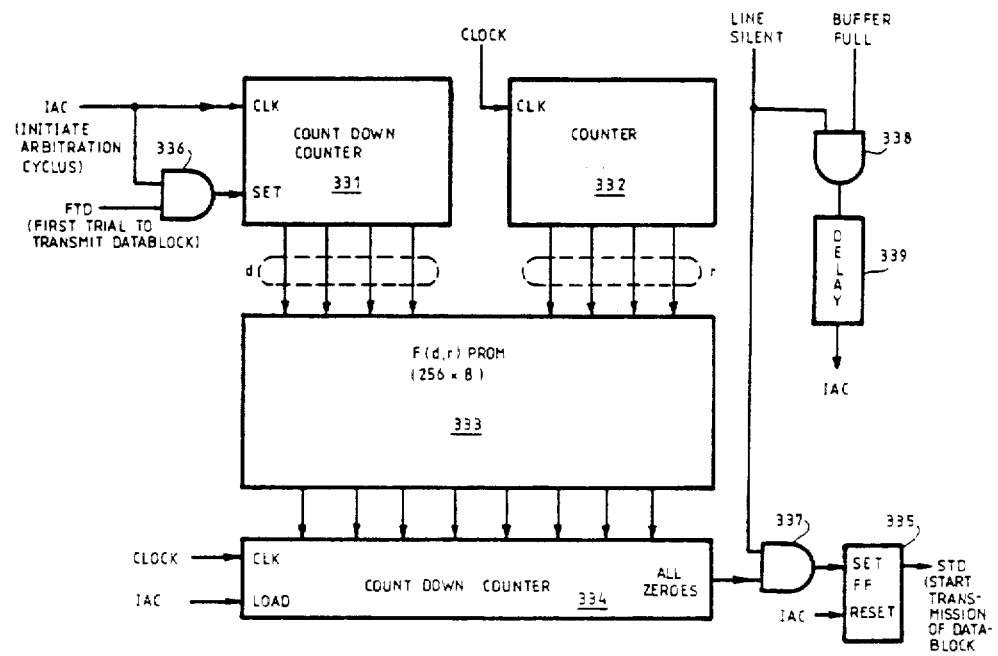

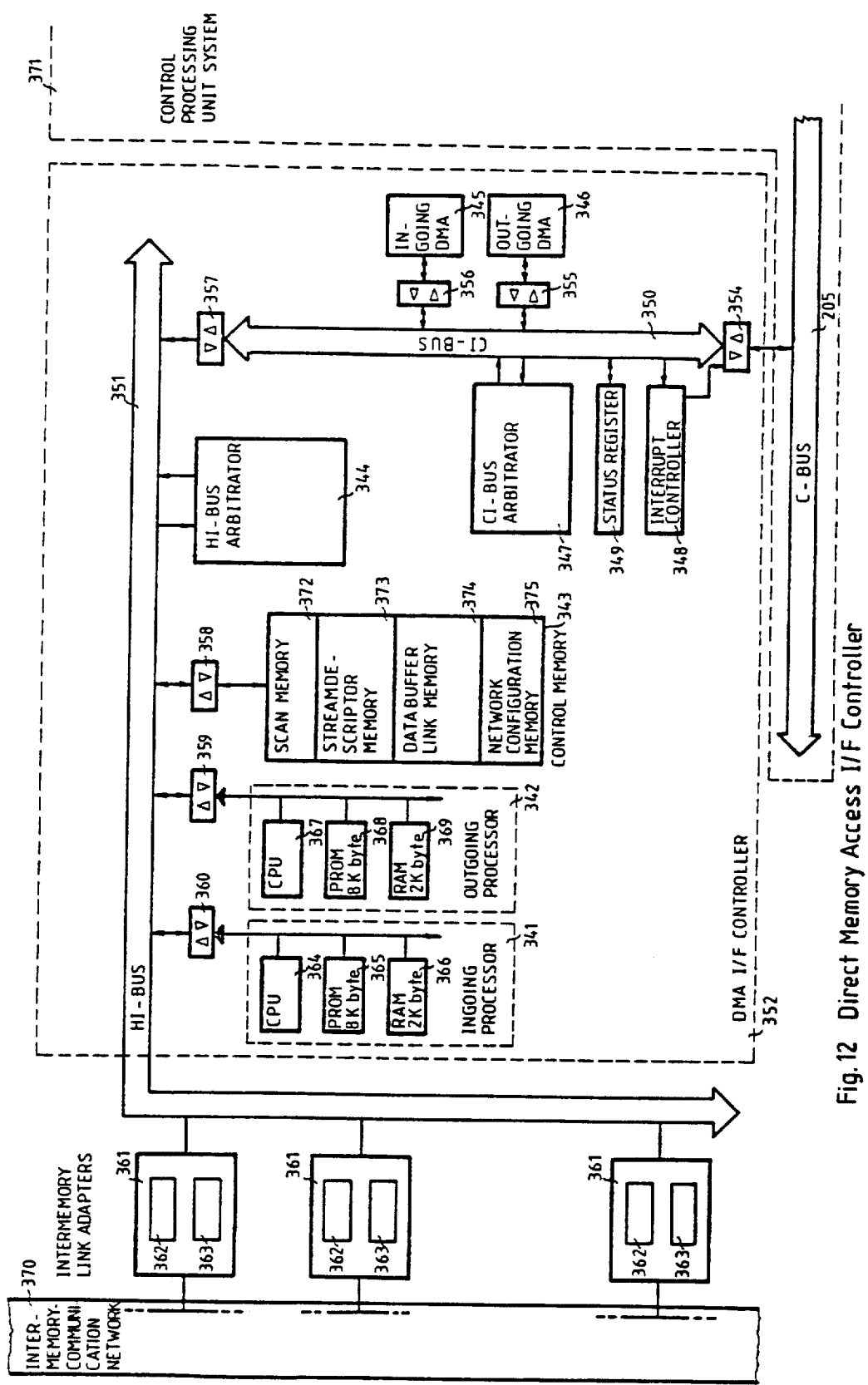
Fig. 12 Direct Memory Access I/F Controller

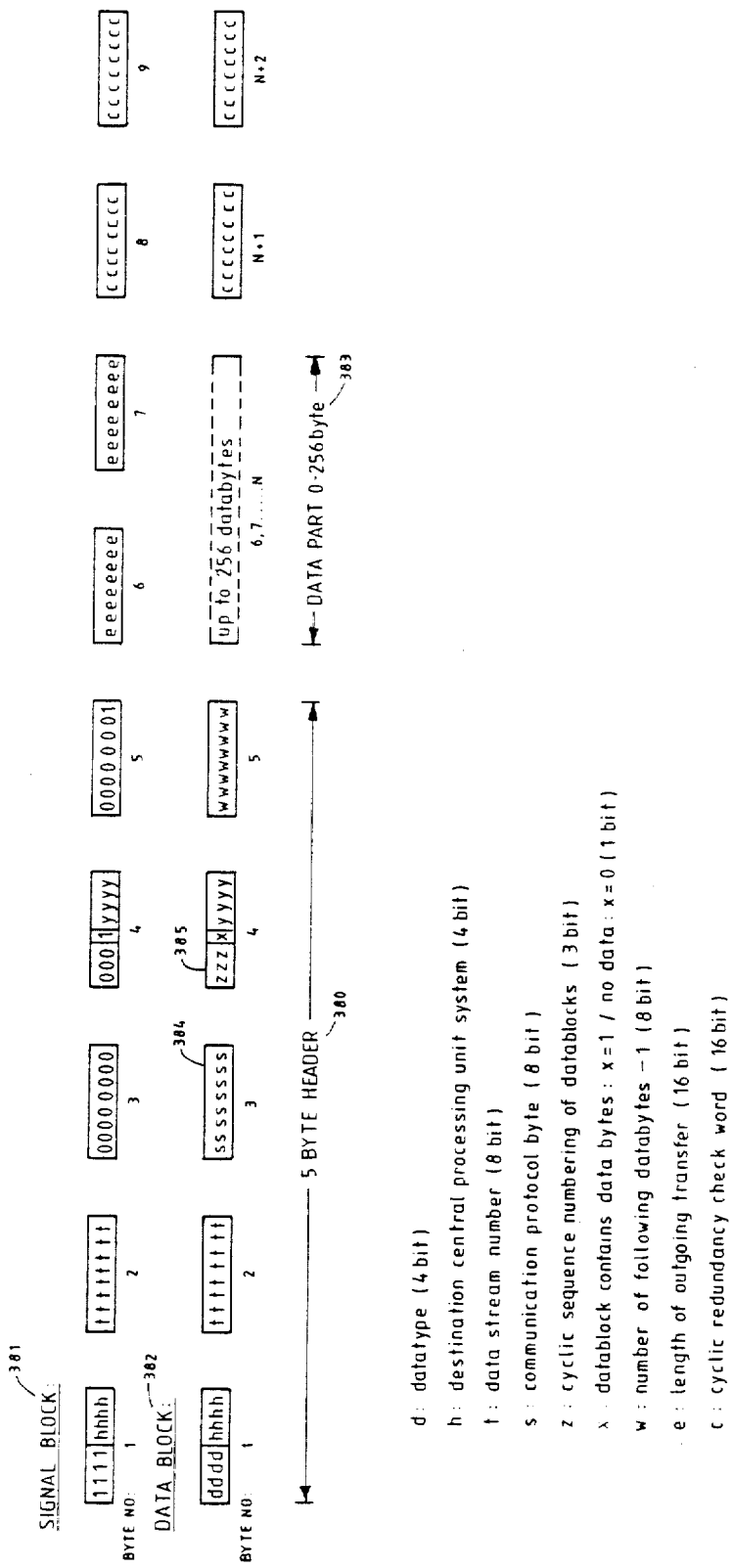
Fig. 13 Format of Data and Signal Blocks

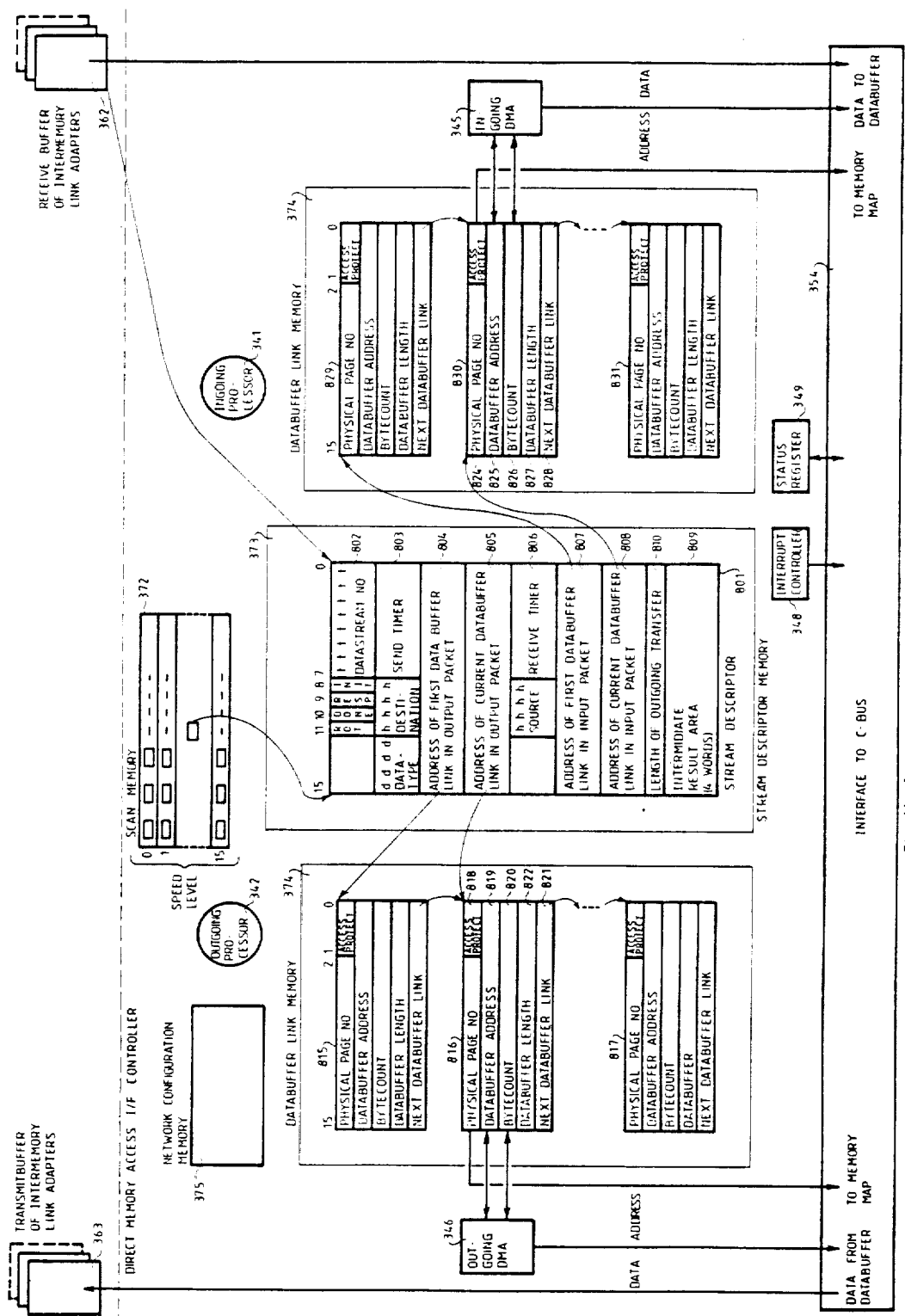
Fig. 14. Direct Memory Access I/F Controller Functions

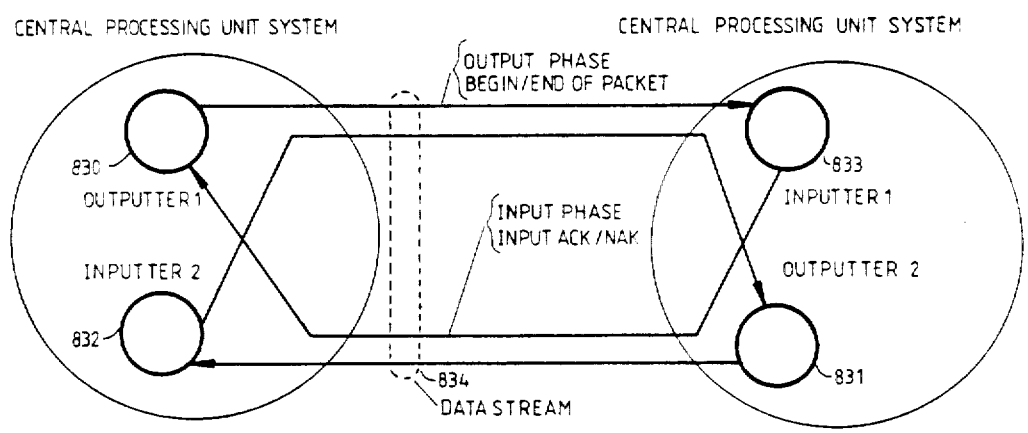

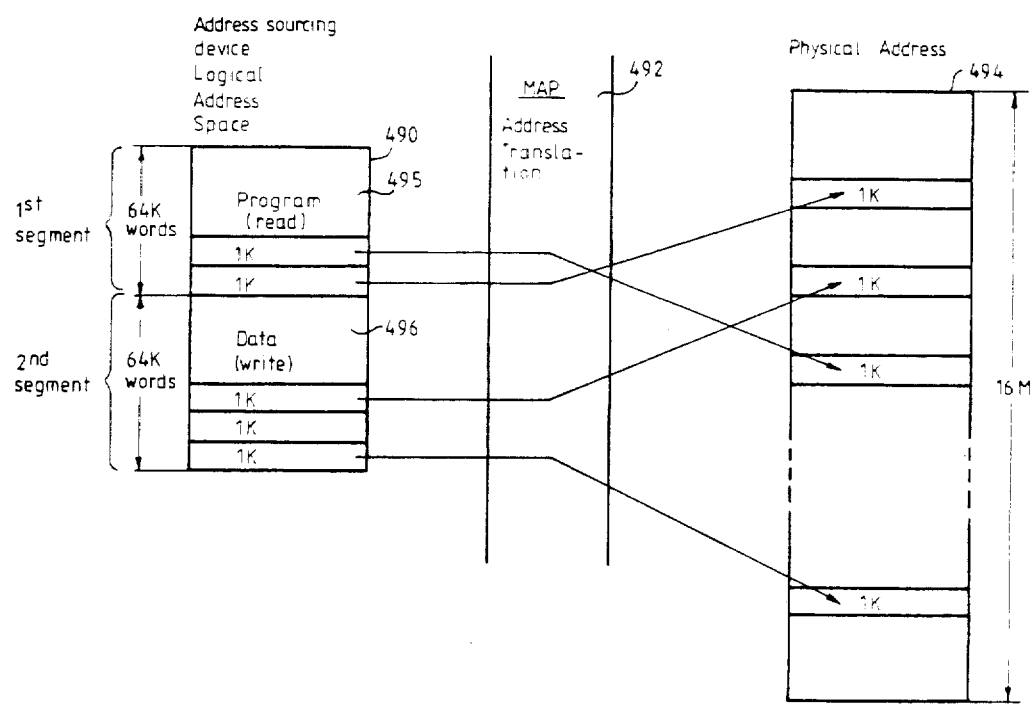
Fig.16 Address sourcing device logical address space

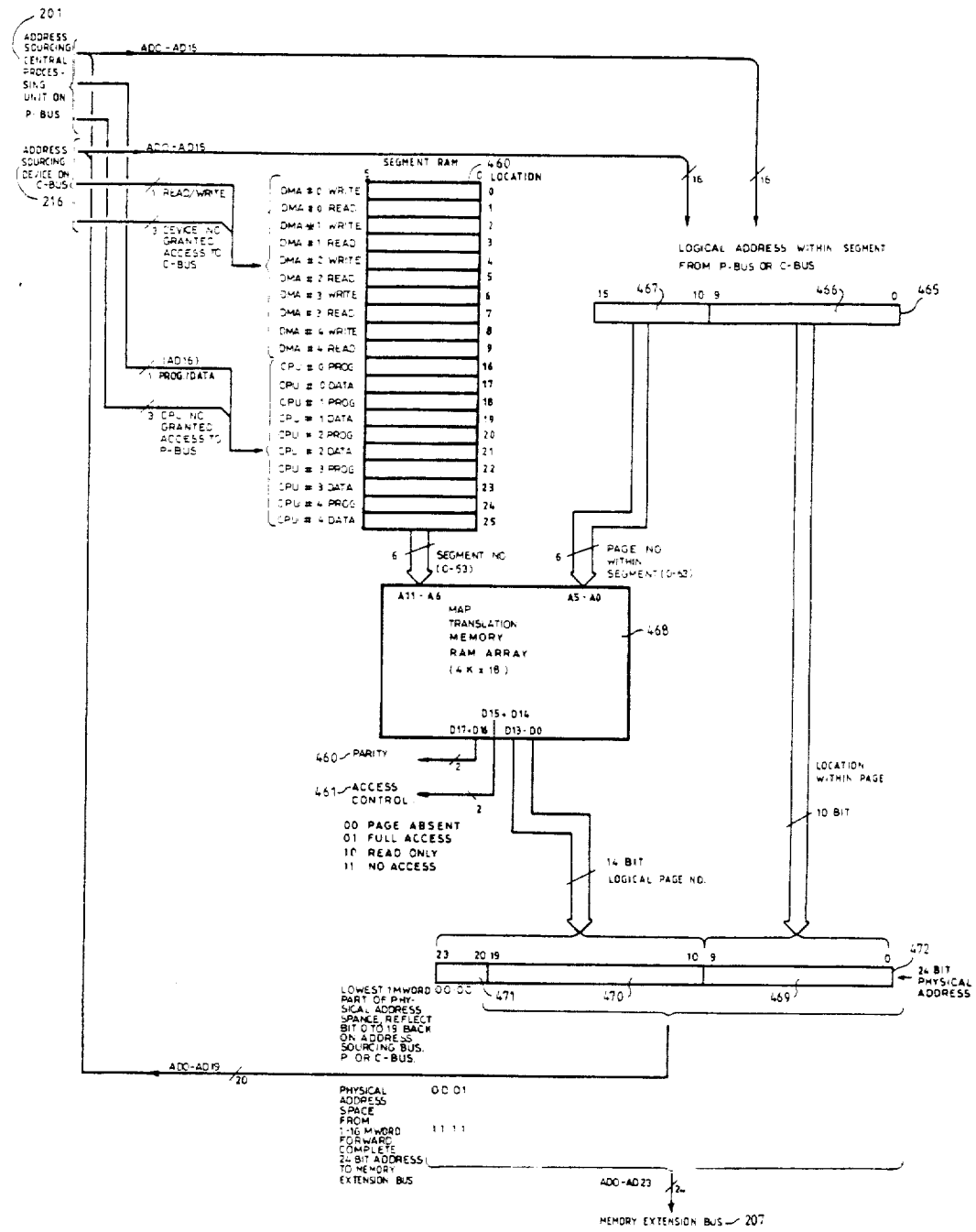
Fig. 17. Memory Map

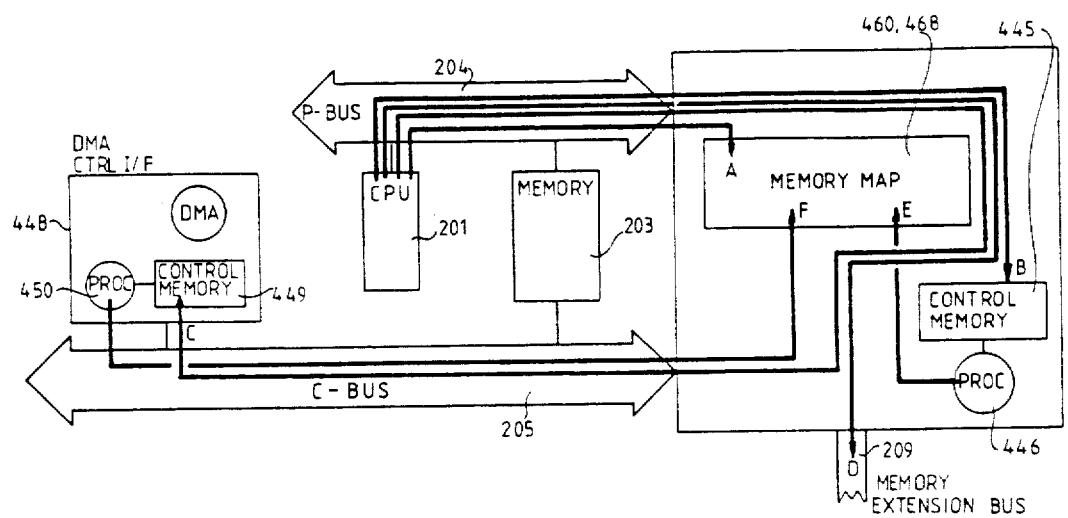
Fig. 18 Priveleged Read/Writes

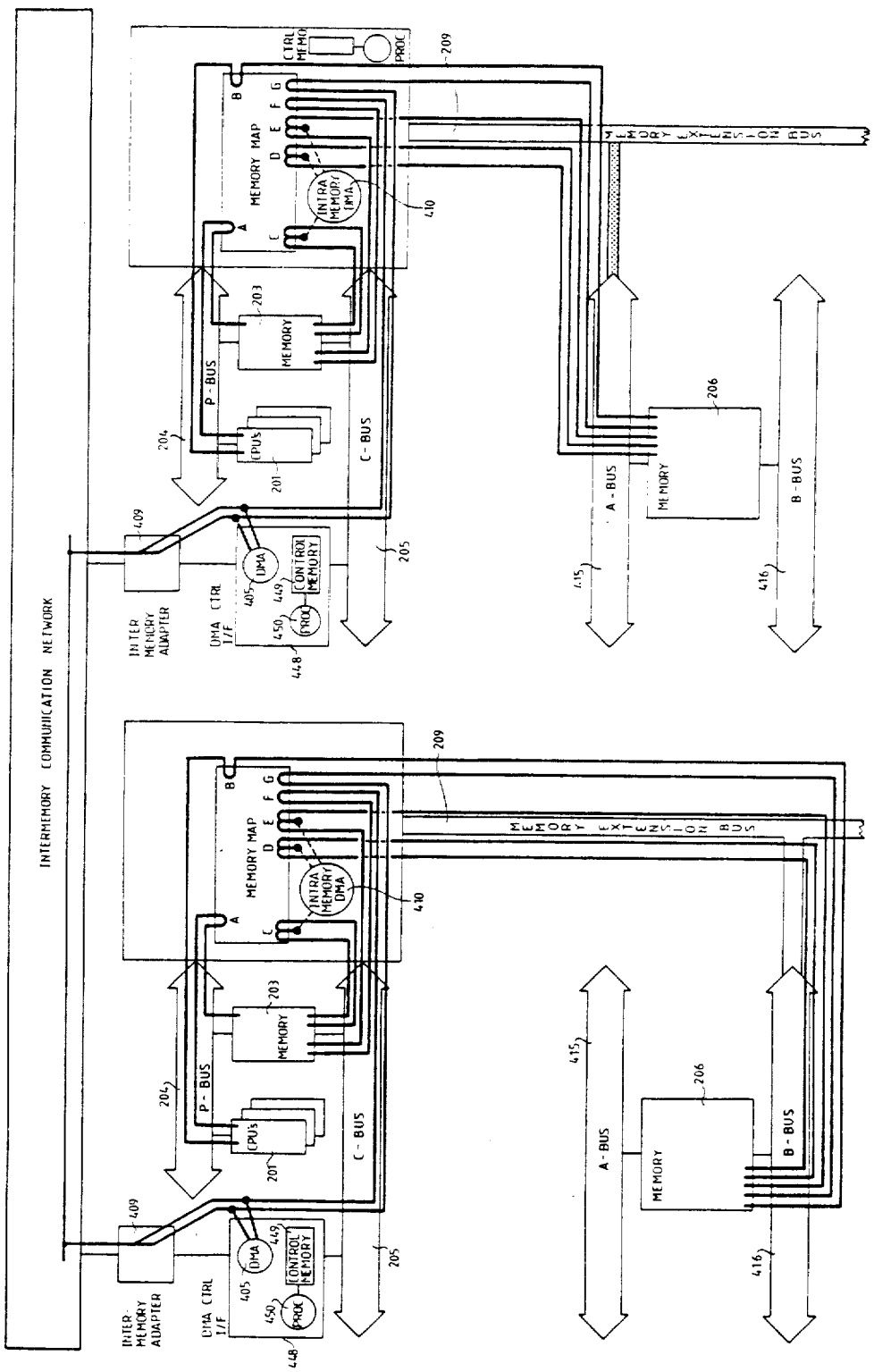
Fig 19 Mapped Datatransfers

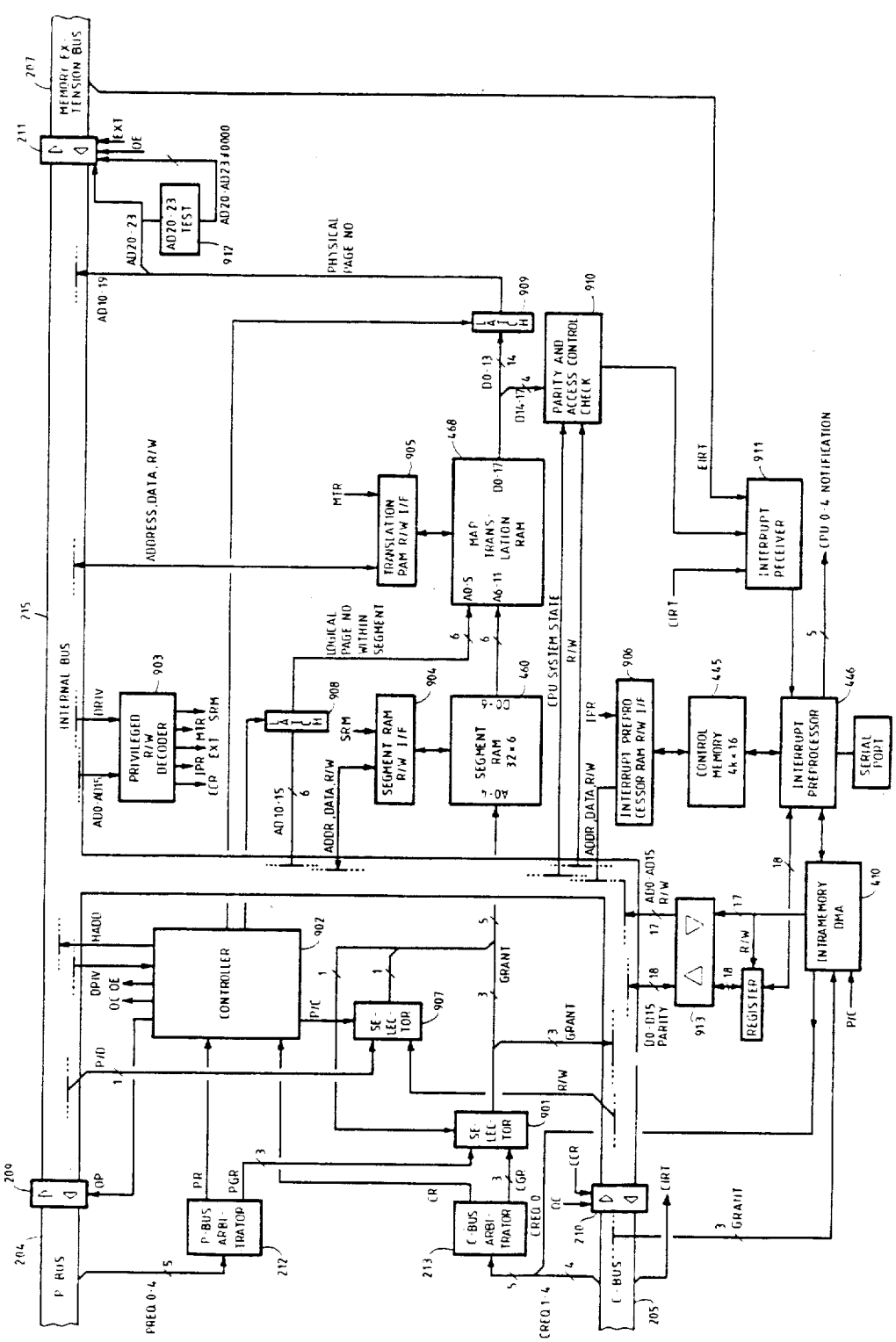
Fig. 20 Memory Map, Interrupt Preprocessor and Intramemory DMA

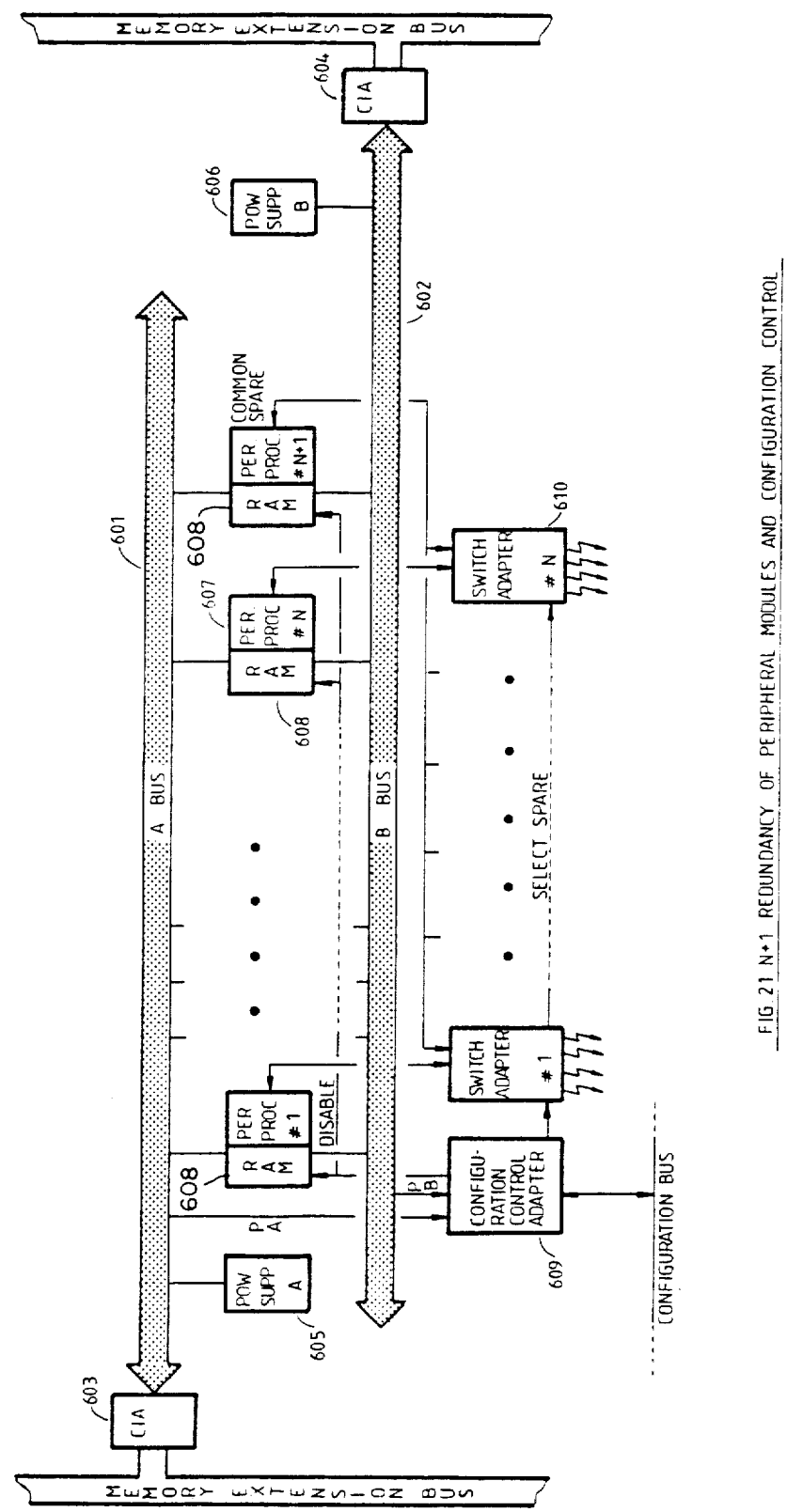
FIG 21 N+1 REDUNDANCY OF PERIPHERAL MODULES AND CONFIGURATION CONTROL

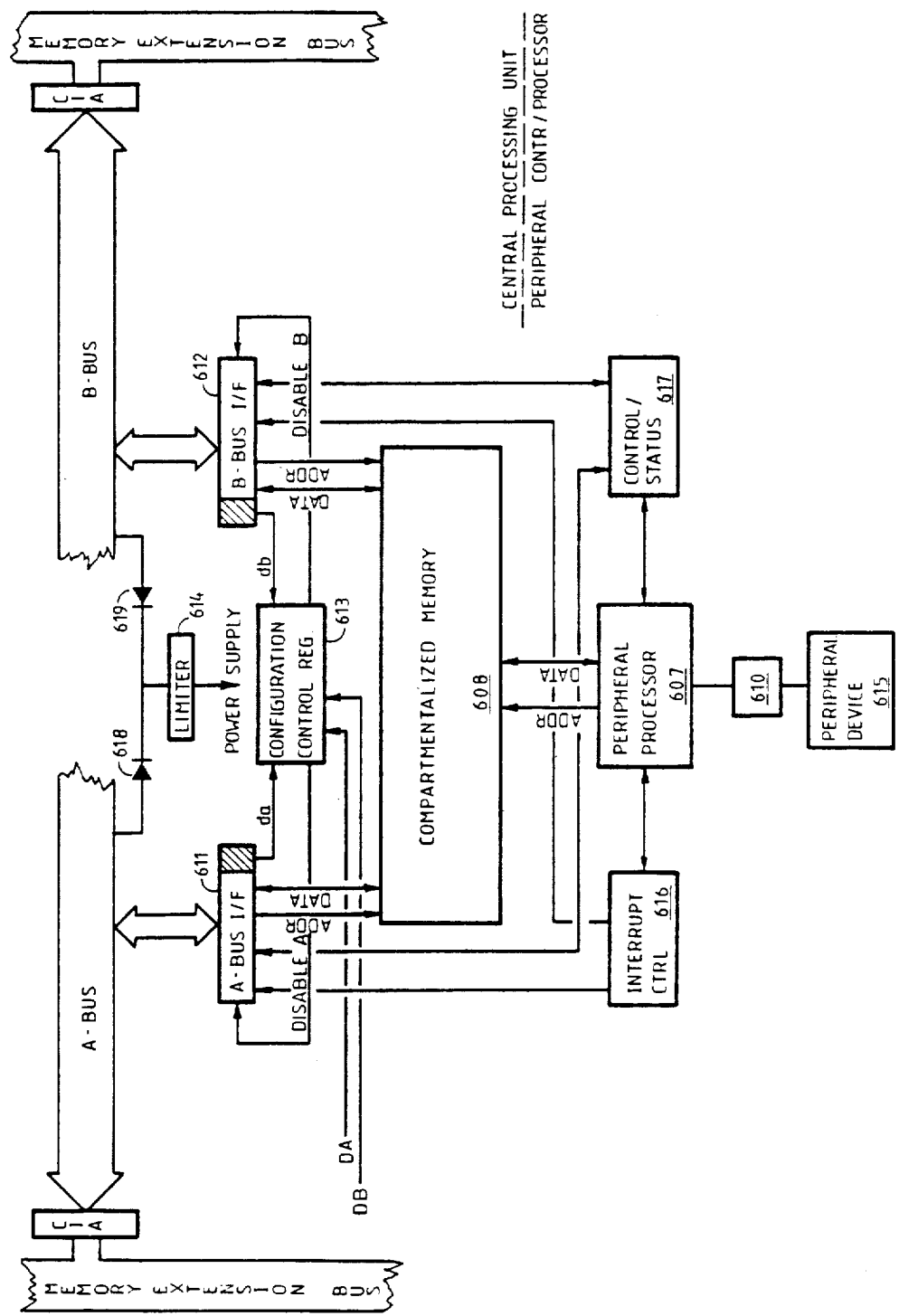
Fig. 22 Compartmentalized Memory Of Peripheral Processor

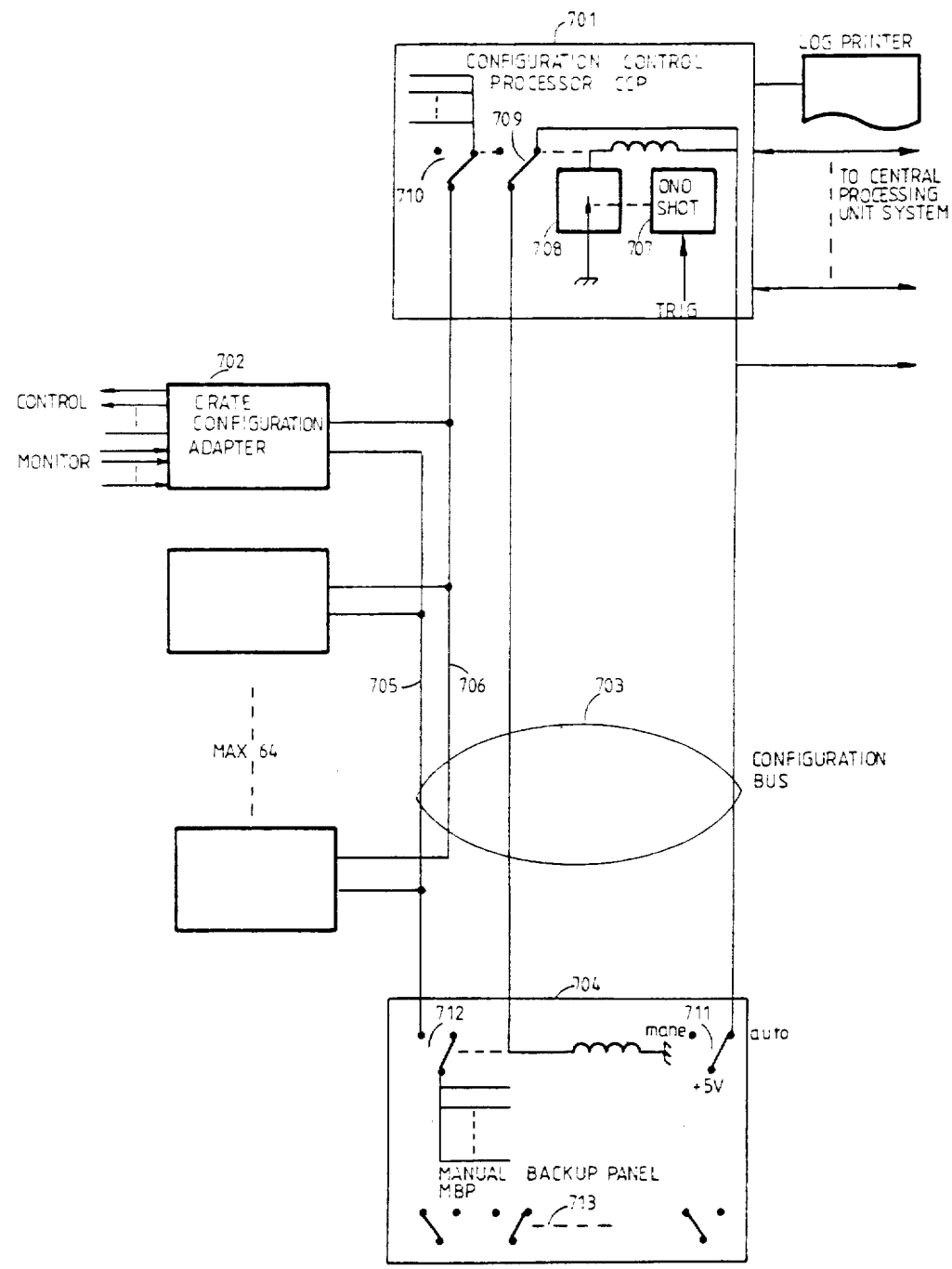
FIG. 23 CONFIGURATION CONTROL PROCESSOR / MANUAL BACKUP

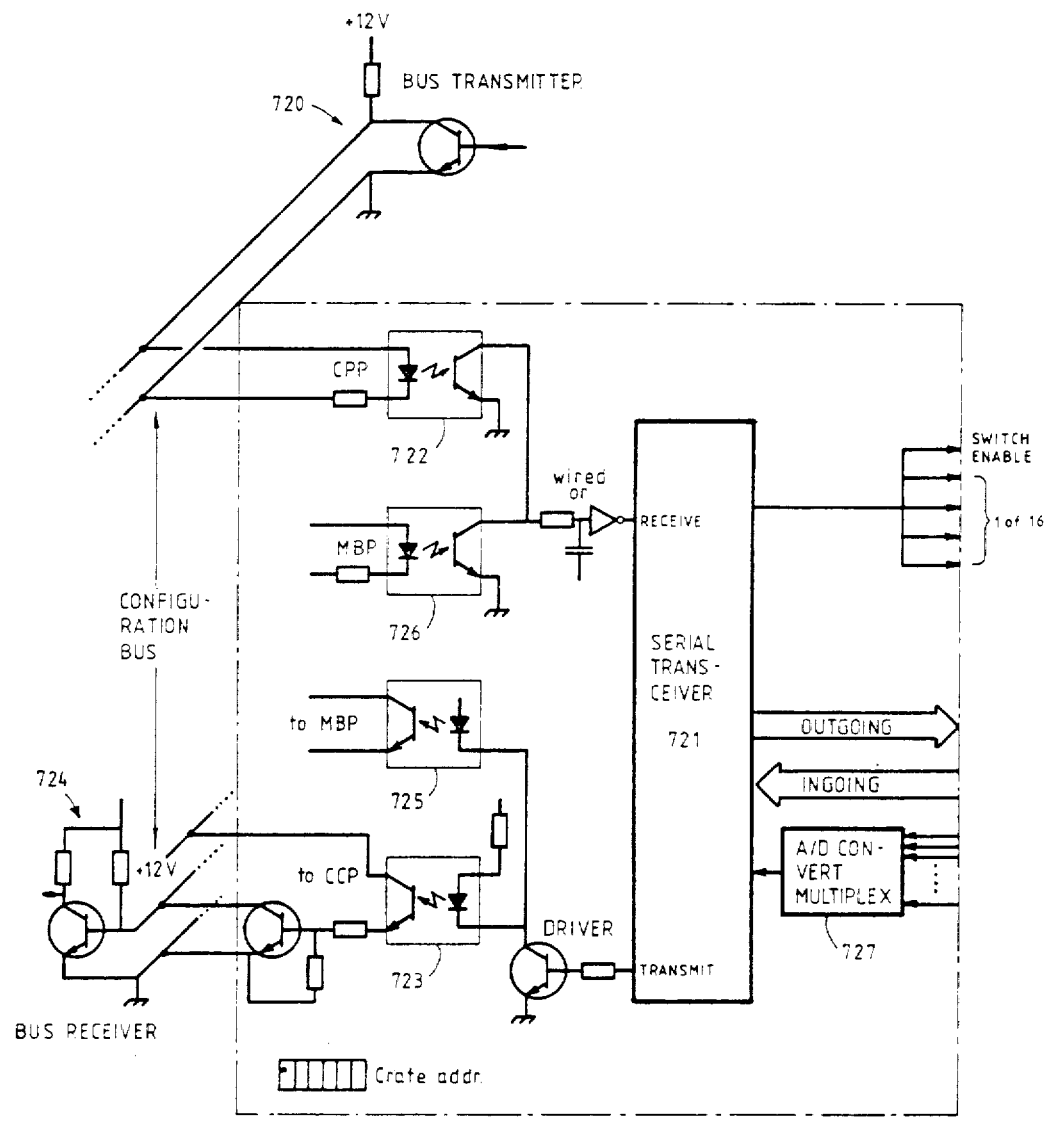
Fig. 24 Crate Configuration Adapter

MULTIPROCESSOR COMPUTER SYSTEM

This is a continuation of application Ser. No. 303,514 filed Sept. 18, 1981, now abandoned.

BACKGROUND OF INVENTION

The invention concerns a multiprocessor computer system, in particular for on-line, high volume, transaction and communication oriented, computing operations, which, especially with a view to such applications, comprises multiprocessing features which involve unprecedented connectivety power, processing power and extension power for meeting present and future needs for very large data processing systems.

Such systems are necessary for on-line processing of large volumes of data at high transaction rates. A case in point is automatic credit card systems or processing of telecommunication data where very large volumes of data very rapidly arrives at the system and these data volumes are to be sorted, preprocessed, recorded, subsequently processed etc.

In addition to these requirements on data processing, the data processing system must satisfy special requirements on fault-tolerance.

It has been realized for some time that to provide for fault-tolerance proper, several processor modules must work together on the data processing task so that the data processing function of a faulty module can temporarily be taken over by another module. The coupling of several processor modules as known has some serious drawbacks.

In a first prior art approach a plurality of general purpose computers, usually only two, are coupled by means of a shared memory. This has the drawback that the entire system breaks down in the event of errors in the memory, and that it is difficult to solve the contention problems which arise when a plurality of computers simultaneously want to communicate via the shared memory.

In another prior art approach a plurality of minicomputers are coupled by their input/output channels. This involves a relatively slow data transport, i.e. a small transfer bandwidth as well as relatively extensive amount of hardware which is to couple the minicomputers which were originally not designed for this application.

This prior art therefore provides no solution to the technical problem, and the same applies to the operating system associated therewith. In still another prior art approach a plurality of processor modules are coupled by means of interprocessor buses, each controlled by a special bus controller, to provide a multiprocessor system. Each of the known processor modules has a central processor unit with access to a memory, which is operatively connected to an input/output channel. A device controller may be connected to input/output channels of several processor modules.

The latter prior art approach is never the less vitiated by some of the above-mentioned drawbacks. Firstly, there are limits to the number of processor units that can be coupled on the interprocessor buses shared by all the processor modules because of a bandwidth problem which can only be solved by providing the multiprocessor system with such extensive hardware as will result in a poor utilization thereof and in a reduction in the transfer power because the handling of such hardware is timeconsuming. Moreover, its connectivity power, i.e. the capacity of the system of rapidly receiving large volumes of data, is reduced because the input/output channels have to share the memory with the Central Processing Units which in turn reduces the processing power which is additionally burdened by the participation of the Central Processing Unit in the transfer of data between the memory and the interprocessing buses. Though this prior art is particularly concerned with fault tolerance, it has moreover the drawback that an error in a device controller causes shut down of all the associated peripheral units. This deficiency is striking as device controllers in systems of present type constitute a predominant part of the entire system.

Conclusively it must be said that the problems of the prior art arose when the need for greater connectivity power and processing power was realized, because the fault tolerance immediately appeared as a prerequisite, which, as mentioned, calls for the cooperation of several processor modules. In the prior art approaches the efforts of obtaining fault tolerance have been at the expense of connectivity power and processing power such that extension power is almost an unknown concept. By this is meant that the number of Central Processing Unit systems can be increased so an extent unknown and impossible by the prior art, which particularly involves bandwidth limitation of multitransferring lines for interconnection of the multiprocessing unit systems.

The object of the invention is to provide a multiprocessor computer system which, is fault-tolerant of course and provides for a great improvement in connectivity power, processing power and extension power separately and in a manner so that the increase of one effect does not noticeably reduce the two other effects. Another object of the invention is to provide a fault-tolerant input/output structure for separate improvement of connectivity power.

Still another object of the invention is to provide a Multiprocessor Unit module for separate improvement of processing power in fault tolerant systems.

Yet another object of the invention is to provide a fault-tolerant intermemory communication network for separate improvement of extension power.

SUMMARY OF THE INVENTION

The multiprocessor computer system of the invention comprises a plurality of Central Processing Unit systems interconnected via an intermemory communication network.

A Central Processing Unit system according to the invention is structured around a core containing a unique bus structure, memory distribution and direct memory access means, said core being designed so that in multiprocessing operations it can cooperate with three satellite systems, whose main functions are substantially mutually independent. These systems comprise a plurality of device controllers, a plurality of Central Processing Units and a plurality of intermemory communication links, collectively termed intermemory communication network.

The processing power does not increase linearly with the number of Central Processing Units because of bus contention, but the processing power can be significantly increased by the use of means to be described, when increasing the number of Central Processing Units.

The memory in a Central Processing Unit system is, according to the invention, divided into several parts, at least one part of which is shared by two or more Central Processing Unit systems, which is particularly related to fault-tolerant operation. More importantly, such shared memory parts or other memory parts are directly addressible from one or more peripheral controllers, providing a unique connectivity power.

Extension power is obtained by means of an intermemory communication network that may be widely branched to a combination of other Central Processing Unit systems in accordance with the bandwidth requirement on the connections, thus established between the memory bus means and the Central Processing Unit systems.

The many possibilities offered by the intermemory communication network can only be turned to maximum account if the address sourcing devices incorporating Central Processing Units, peripheral device controllers and direct memory access means are coupled to the memory bus means so that data transfers within the said core can be effected as independently of one another as possible.

Expansion of the multiprocessor computer system of the invention will not cause the known bandwidth problems because the intermemory links constituting the intermemory communication network do not have to be connected to all the Central Processing Unit systems, but may be divided into lengths of a varying size corresponding to the bandwidth requirement.

An important unit in the multiprocessor computer system of the invention is the configuration control means serving as a watchdog for the overall system. One of the tasks of the configuration control means is to present memory fractions either to a Central Processing Unit system or for division between several Central Processing Unit systems.

Configuration control means may be incorporated in the actual Central Processing Unit system and be interfaced to said intermemory communication network, but may also be separate from said intermemory communication network and said memory bus means.

Another of the functions of the configuration control means is to monitor voltage, current or temperature conditions in the printed circuit cardcages of the multiprocessor computer system and, e.g. in response thereto, enable and disable data transfer to the intermemory network and all or a fraction of the memory bus means of one or more of said Central Processing Unit systems. The monitoring of the multiprocessor computer system is particularly important as the fault-tolerant environmental conditions become marginal as this leads to increased failure rates of the modules of the fault-tolerant computer. As an additional safety control, backup control means are provided to protect the multiprocessor computer system against errors in the configuration control means.

To additionally protect the multiprocessor system of the invention, at least the configuration control means and the operatively movable parts of the memory controlled by the configuration control means are supplied with power via power combination circuits from at least two separate power supplies.

As mentioned in the foregoing, direct memory access controllers are provided, initiated by a Central Processing Unit for moving data words from one part of the Central Processing Unit system memories to another part of said Central Processing Unit system memory. It should be noted that apart from few privileged instructions, all data transports are effected via memory map means designed to monitor and keep track of all the data transfers in a Central Processing Unit system.

According to the invention direct memory access control means are provided for transferring a stream of data via the intermemory communication network between memories of two specified central processing unit systems and wherein one of said specified central processing unit systems having a sending buffer established for that data transfer stream only, while the other of said specified central processing unit systems having a receiving buffer established for said data transfer stream only.

According to the invention these buffers are established in conjunction with a so-called stream descriptor defining free memory space allocated to that stream descriptor only, the stream descriptor being deleted when a requested data transfer is terminated thereby disengaging the memory space allocated in conjunction with that stream descriptor. The stream descriptor is established by way of unique means in the said direct memory access controller comprising means for receiving a request for establishing a stream descriptor, interrupt means for interrupting a central processor unit and a control memory local to that direct memory access controller.

The said direct memory access control means further comprises speed control means for controlling the rate of transfer of each data transfer stream going into the intermemory communication network from those buffers in memory being specified as source, thereby ensuring a specified rate of transfer of each said data transfer streams independently of each other to the intermemory communication network and independently of a central processing unit.

According to a further aspect of the invention a central processing unit system comprises at least one group of peripheral processors being arranged to address only one respective compartment of the memory means said compartments being separate and operatively connected to memory bus means and wherein the peripheral processors but one normally being connected to respective peripheral devices via respective switchover modules said one peripheral processor being a back up processor for taking over the task of a failed peripheral processor thereby ensuring N+1 redundancy.

The aforementioned means for reducing contention on a bus connected to a memory and being common to a plurality of central processing units in a multiprocessor module comprises cache memory being effective to inhibit a central processing unit comprising cache memory in accessing a memory location in said memory if a copy of the corresponding location contents is present in the cache memory.

The unique bus structure of the central processing unit system of the invention incorporates three data paths wherein memory bus means operatively connecting central processing units along a first path, and operatively connection address sourcing devices other than the central processing units along a second path to a first part of memory, and operatively connecting said central processing units and said other address sourcing devices along said first path and second path respectively, and along a common third path to the remaining second part of said memory. Said first and second path being effective for said central processing units and said address sourcing devices to access the first part of the memory without contention with each other, and for diminishing contention with each other when accessing the second part of the memory.

The link adapters for interfacing a central processing unit system to the intermemory communication network are according to the invention arranged to automatically arbitrate the use of a related intermemory communication link when the respective transmit buffers are full. Further the direct memory access control means coorporating with the link adapters are arranged automatically to fill empty transmit buffers of the link adapters. Thereby is transfer of data between central processing unit systems via the intermemory communication network obtained without attendance by central processor units.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention.

BRIEF DESCRIPTION OF THE DRAWINGS

FIG. 2 is a block diagram showing details of a central processing unit system illustrated in FIG. 1.

FIG. 3 is a fraction of a multiprocessor computer system showing an embodiment of the structure of the intermemory communication network of the invention.

FIG. 4 is similar to FIG. 3 but showing another embodiment of the intermory communication network of the invention.

FIG. 5 is a block diagram of an embodiment of a multiprocessor module according to the invention and may be referred to, for details of the central processing unit system illustrated in FIG. 2.

FIG. 6 is a graph showing the enhancement of processing power in a multiprocessor module incorporating cache memory as illustrated in FIG. 5.

FIG. 7 is a table illustrating the principle of the cache memory.

FIG. 8 is a detailed block diagram related to the explanation of the performance of the cache memory illustrated in FIG. 5.

FIG. 9 is a coupling scheme showing the connection of a single intermemory communication link to a plurality of intermemory link adapters.

FIG. 10 is a block diagram showing details of the intermemory link adapter illustrated in FIG. 9.

FIG. 11 is a block diagram showing a transmission timer circuit incorporated in the transmit state controller illustrated in FIG. 10 and showing a table contained in that transmission times circuit for better understanding of the arbitrating means of the invention.

FIG. 12 is a detailed block diagram of the direct memory access interface controller illustrated in FIG. 2 showing the control memory and interrupt controller needed to establish a stream descriptor according to the invention.

FIG. 13 indicates the preferred format of data and signal blocks transmitted through the intermemory communication network.

FIG. 14 is a detailed listing of the control memory illustrated in FIG. 12 to demonstrate partly the establishing of a stream descriptor and partly further control processing for accelerating the data transfers to effective utilization of the extensive intermemory communication network of the invention.

FIG. 15 is a comprehensive view of datastream flow in relation to FIG. 14.

FIG. 16 is a diagram showing the translation by the memory MAP of 128 Kword logical address space of an address sourcing device into a 16M word address space of physical memory in a central processing unit.

FIG. 17 is a functional diagram showing the use of the segment RAM to provide each address sourcing device of a central processing unit with a private pair of segments together with the MAP translation memory defining the translation from device logical address space to physical address space of the memory.

FIG. 18 is a block diagram showing different paths of priviliged read/write for setting up memory MAP, control memory and control status registers of the control processing unit system without memory MAP translation of the addresses.

FIG. 19 is a block diagram showing the different memory mapped data transfers within the central processing units.

FIG. 20 is a detailed functional block diagram showing the memory MAP, interrupt preprocessor and intramemory DMA controller.

FIG. 21 is a block diagram showing a common fraction of the memory of two central processing unit systems being compartmentalized to a respective peripheral processor said processor being arranged for N+1 redundancy.

FIG. 22. is a block diagram showing in greater details one memory compartment of FIG. 21 and components associated with that compartment.

FIG. 23 is a block diagram showing an embodiment of the configuration control processor according to the invention connected to a plurality of crate configuration adapters.

FIG. 24 is a block diagram and coupling scheme of the crate configuration adapter illustrated in FIG. 23.

THE MULTIPROCESSOR COMPUTER SYSTEM

Figure 1:
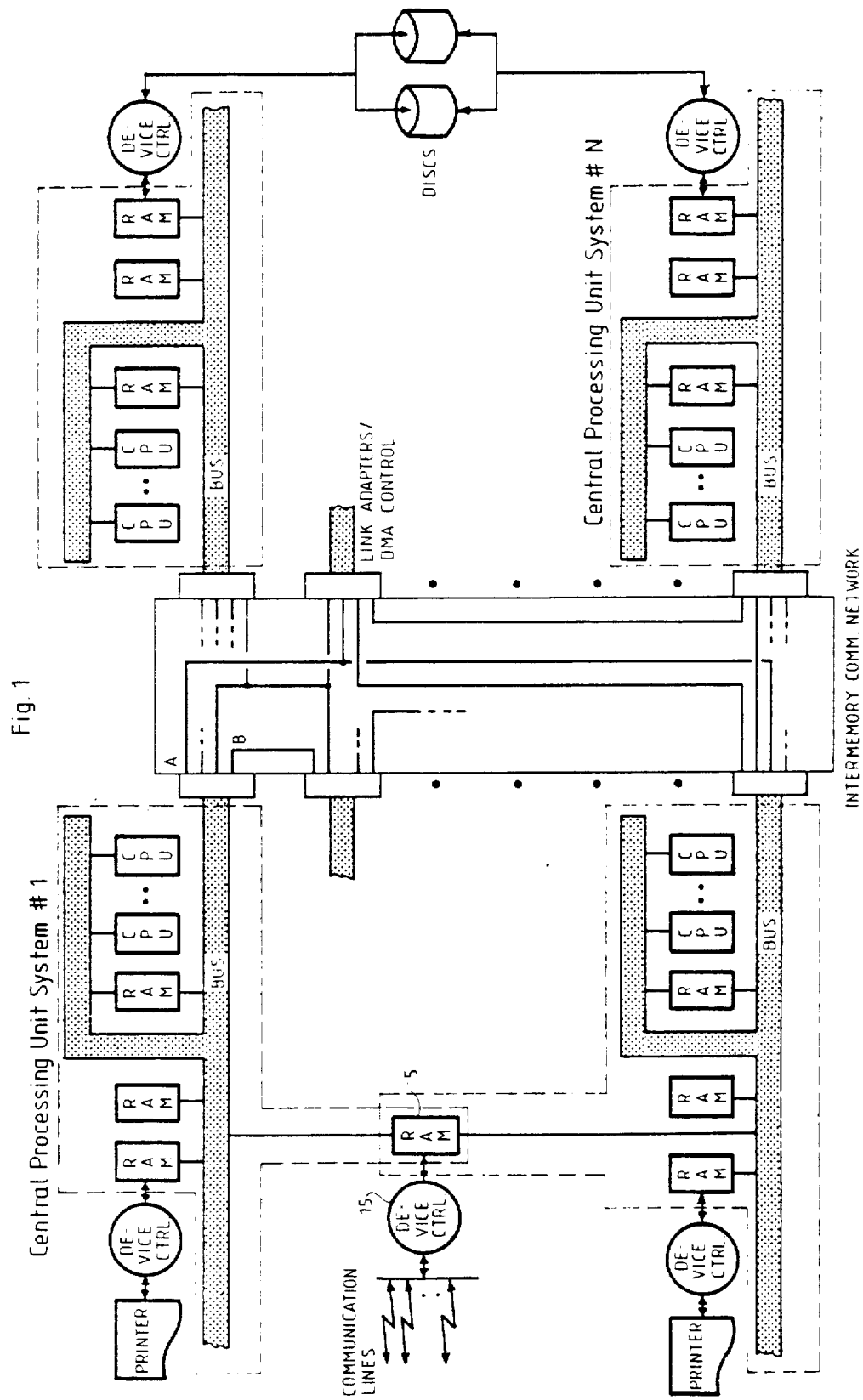
FIG. 1 is a block diagram of an embodiment of the overall multiprocessor computer system of the invention and showing a plurality of central processing unit systems interconnected by an intermemory communication network.

FIG. 1 shows an embodiment of the multiprocessor computer system of the invention. The drawing shows a plurality of separately framed Central Processing Unit systems numbered from 1 to N and connected for intercommunication via the schematically shown intermemory communication network; the bus means of each Central Processing Unit system is connected to the intermemory communication network through link adapters/direct memory access controllers.

A detailed example of the configuration of a Central Processing Unit system is shown in FIG. 2, but first some main features of the computer system structure will be described in connection with FIG. 1. An essential aspect is that the memory of each Central Processing Unit system is divided into fractions, at least some of which are common to two or more Central Processing Unit systems. This is illustrated in FIG. 1 by the memory 5, which, by means described later, can be operatively connected to one of the two Central Processing Unit systems whose two frames contain the memory 5.

The memory 5 has three ports, where the third port is connected to a device controller 15, which controls a direct connection between a large number of communication lines and the memory 5. Communication data can therefore be entered directly in the memory 5 and are accessible from one or the other of the Central Processing Unit systems, in response to their respective load; one of the systems can take over the data transport completely in case of failure in the other system. These data transports can take place without loading the central processing units in a Central Processing Unit system, but more importantly, the system of the invention allows data entered in the memory 5 to the transferred via an intermemory communication network to a memory fraction in another Central Processing Unit system without the respective Central Processing Units being loaded by the data transfer. Data can be readily read out from the latter memory fraction if this fraction too, is connected directly to a device controller. The number of device controllers may be very great, and as data may be transported without the assistance of central processing units, the density of information on the bus lines can be so great that the bandwidth requirement of the intermemory communication network cannot be met by the known methods when the multiprocessor computer system is expanded to an extent that may be needed already today. Another essential feature of the invention is therefore to design the intermemory communication network so that the system of the invention can expanded to meet any need. This will appear from the below explanation of the examples shown in FIG. 3 and 4 of intermemory communication networks.

FIG. 2 shows in detail an example of the main structure of a Central Processing Unit system. It is explained in the foregoing how the system of the invention can handle the transport of very large quantities of data, which entails that the central processing units of each Central Processing Unit system must be capable of handling data quantities correspondingly rapidly. To this end the Central Processing Unit system comprises a plurality of e.g. five central processing units 1, which via the P-bus 6 have direct access to a fraction 2 of the memory in the Central Processing Unit system. The central processing units 1 have thus direct access to the memory 2 independent upon the traffic on the C-bus 7 and a memory extension-bus 8, and to additionally improve the efficiency of the central units, each of them is provided with a Cache memory which significantly reduces the necessary communication of the central processing units with the memory 2.

The division of the memory, previously discussed, in each Central Processing Unit system appears from FIG. 2; in addition to the memory 2, which normally only constitutes a small fraction of the total memory of the Central Processing Unit system, other memories 3,4 and 5 are provided, the memory 5 of which, with associated device controller 13 can be compared to FIG. 10. also the memory 4 is connected direct to a device controller, which may e.g. operate a printer, while the memory 3 solely serves to increase the total memory capacity. A direct memory access controller 13 serves to control the transport of data between the said memory fractions, and it is noted that at least the memory fraction 2 is dual ported so that data may be transported between the memory fraction 2 and e.g. the memory fraction 5 without disturbing the central processing units. The reference numerals 9, 10 and 11 represent bus driver circuits which separate the buses 6, 7 and 8 in response to the need of current changes in the bus transport. The separators 9, 10 and 11 may be controlled in a manner known per sec and will therefore not be explained in detail. However, it is noted that apart from a few privileged instructions, all data transports via the buses 6,7 and 8 will take place via a memory map module 12 which monitors all transports of data in Central Processing Unit system. Many of the data transfers are interrupt controlled, which is preprocessed in an interrupt preprocessor 14, which, like the components already mentioned, will be elaborated later in the specification.

The C-bus 7 in principle may also be connected to peripheral units e.g. via the controller 16, but preferably serves as a memory bus means for direct data communication between a memory fraction in a Central Processing Unit system and a memory fraction in another Central Processing Unit system via intermemory communication links shown in FIG. 2; all the intermemory communication links in the multiprocessor computer system of the invention constitute an intermemory communication network as schematically shown in FIG. 1. The connection between the bus 7 and the intermemory communication links is provided for through a plurality of direct memory access interface controllers, two controllers 17 and 18 of which are shown in FIG. 2. As shown in the figure, each controller is connected to a plurality of adapters, adapters 19, and 20 being shown in connection with the controller 17; the adapters 19 and 20 are connected to their respective intermemory links 21 and 22. In a preferred embodiment, the C-bus 7 is connected to a total of four controllers of the type 17, 18, which are each connected to up to 32 adapters of the type 19, 20. For clarity, the intermemory links associated with the controller 17 are grouped (A), cf. the symbols A and B in FIG. 1, which, however, does not restrict the scope of invention because some of the intermemory links from the group A may very well be extended to a first combination of other Central Processing Unit systems, while other intermemory links from the group A are extended to another combination of other Central Processing Unit systems. Some concrete examples of intermemory communication networks will be described in connection with FIGS. 3 and 4.

FIG. 3 schematically shows nine Central Processing Unit systems from a multiprocessor computer system, which may be additionally expanded in accordance with the structure shown in FIG. 3. The Central Processing Unit systems are arranged in rows called N, P and R, respectively, which are mainly connected to respective intermemory communication link groups N1, P1 and RL, respectively. This should be taken to mean that the latter intermemory communication link groups occupy a predominant part of the link adapters in the respective rows of Central Processing Unit systems. The remaining, relatively small number of link adapters is intended for the vertical intermemory communication links shown in FIG. 3.

The intermemory communication network, which is schematically shown in FIG. 3 and is particularly useful for processing large data quantities, may be divided into relatively defined data processing sections. It is conceivable for example that a very intense data traffic arrives at the row of Central Processing Unit systems N, N+1 . . . and that a first relatively defined part of the data processing takes place in the row N in connection with extensive use of the intermemory communication link group NL for producing intermediate result data, whose extent is considerably smaller than the extent of the data signals originally received, so that the intermediate results can readily be transferred from the N-row to the P-row of the Central Processing Unit systems of the relatively small bandwidth offered by the vertical intermemory communication links. The intermediate results may then give rise to an extensive, new type data processing in the P-row of the Central Processing Unit systems in connection with extensive use of the intermemory communication link group PL. The described sequence may conceivably continue to the R-row of the Central Processing Unit systems, and further on according to requirements.

The example of an intermemory communication network of the invention described in connection with FIG. 3 has quite evident advantages over the prior art, where all the Central Processing Unit systems are connected to one or more communication buses common to all the unit systems. The bandwidth problems on such a communication bus would be insurmountable, but this problem has been solved by the invention, as illustrated by way of example in FIG. 3 where the multiprocessor computer system of that figure may be expanded to an extent which is not feasible in part because of the bandwidth problems in connection with the data transmission.

The intermemory communication network shown in FIG. 3 is tolerant to failures. If, e.g., a Central Processing Unit system N+1 should fail, its operation may be temporarily taken over by the Central Processing Unit system N+2, because the latter unit system has access to a duplicate of the user programs of the faulty central processing unit system via the discussed memory system, which may partly be common to several of the Central Processing Unit systems in the N-row.

FIG. 4 schematically shows another embodiment of the intermemory communication network of the invention, where the Central Processing Unit systems, for convenience, are designated as in FIG. 4. Each Central Processing Unit system is only connected for direct intercommunication with adjacent central processing unit systems. This intermemory communication network connects e.g. the Central Processing Unit system P+1 directly to the Central Processing Unit systems P, R+1, P+2 and N+L via groups of intermemory communication links AL, BL, CL and DL respectively, which is sufficient in some cases. It can be estimated in advance how extensive the data communication will be between pairs of Central Processing Unit systems so that the intermemory communication link bandwidth may be adapted according to requirements. If it is assumed e.g. that the data exchange between P and P+1 is twice as great as the data exchange between P+1 and N+1, the bandwidth of AL may be designed to be twice as great as the bandwidth of DL, which means that the intermemory communication link group A1 contains twice as many communication links as the link group DL. The Central Processing Unit system P+1 may have twice as many link adapters connected to the AL as the number of links adapters connected to DL. The example in FIG. 4 thus illustrates how each Central Processing Unit system may be connected directly to four other Central Processing Unit systems, using the bandwidth in the intermemory communication network to the maximum. This network may be expanded in any manner, e.g. by expanding it in more dimensions than the two dimension configuration shown.

The tolerance to failures of the intermemory communication network of FIG. 4 is not as evident as that explained in connection with the intermemory communication network of FIG. 3. However, a computation of the probability of failures will often disclose that the bandwidth requirements on the intermemory communication links loaded under correct operation. Accordingly, there might be provided a multiprocessor computer system of the base structure shown in FIG. 4 with a very great total bandwidth, and the base structure may have a preestimated faulty-operation-optimized superstructure of intermemory communication links having a significantly lower total bandwidth. The total picture of the intermemory communication network might e.g. result from placing FIG. 3 on top of FIG. 4 so that the Central Processing Unit systems uniformly designated merge to form a Central Processing Unit system.

It is explained in the foregoing how the overall structure of the multiprocessor computer system of the invention meets future requirements on very rapid and failure-tolerant processing of ever increasing data quantities. Some of the components of the system which likewise contribute to the unique data processing capacity, will be explained in detail in below.

THE MULTIPROCESSOR MODULE

The Central Processing Unit system shown in FIG. 2 includes a multiprocessor module as shown in FIG. 5.

The general purpose of the multiprocessor module as shown in FIG. 5 is to allow the Central Processing Units 201 to share the use of the P-bus 204 for access of the Central Processing Unit system memory 203, 206.

It is an important feature of the present invention that Central Processing Units 201 has a Cache memory 202 connected to them so that access by a Central Processing Unit 201 to read the content of a location in memory 203 via the P-bus 204 is inhibited if the content of that location is already found in its connected Cache memory 202.

As the limiting factor to the maximum total number of instructions executed per second by the multiprocessor module is contention by the Central Processing Units 201 on the P-bus 204, the reduction in necessary accesses to the P-bus 204 obtained by use of the Cache memories 202 raises significantly the processing power of the multiprocessor module.

FIG. 6 shows the enhancement of the multiprocessor module total processing power obtainable, by utilizing Central Processing Units 201 each including a Cache memory 202, in comparison with utilizing Central Processing Units 201 not having Cache memory 202, as a function of the number of the installed Central Processing Units 201 in the multiprocessor module and measured in units of equivalent processing power obtained by a multiprocessor module 214 only containing a single Central Processing Unit 201 without Cache memory and thereby having no contention of the P-bus 204. It is seen from FIG. 6 that with only one installed Central Processing Unit 201 in the Multiprocessor module 214 the Central Processing Unit 201 with connected Cache memory 202 provides slightly more processing power, this is due to the Cache memory 202 having faster access than the memory 203, 206. Increasing the number of installed Central Processing Units 201 in the multiprocessor module 214, it is seen from FIG. 6 that total processing power of the multiprocessor module 214 is limited to that corresponding to two equivalent stand-alone central processing units, when there are three or more installed Central Processing Units 201 without Cache memory 202 in the multiprocessor module 214, due to contention between the Central Processing Units 201 on the P-bus 204. It is further seen that, by installing Central Processing Units 201 with connected Cache memory 202 in the multiprocessor module 214, processing power is substantially increased. For example, when five Central Processing Units 201 with connected Cache memory 202 are installed on the P-bus 204 in the multiprocessor module 214, a processing power is obtained corresponding to 4.5 equivalent stand-alone Central Processing Units due to the Cache memory 202 decreasing contention between Central Processing Units 201 on the P-bus 204.

The Cache memory 202 implements the following functions:

In memory 203 read operations from the connected Central Processing Unit 201, the cache memory 202 is read prior to accessing the memory 203, and if data is present in the Cache memory 202, the data is presented to the Central Processing Unit 201, not involving a memory 203 access. If absent in the Cache memory 202, the memory 203 is read, via P-bus 204, and the data is presented to the Central Processing Unit 201 and, at the same time, copied in the Cache memory 202.

Memory write operations from the connected Central Processing Unit 201 to a memory 203 location cause the corresponding Cache memory location to be updated. Memory write operations to locations in memory 203 from other Central Processing Units 201 on the P-bus 204 or address sourcing devices 216 on C-bus 205 cause deletion of the copies which was previously stored in the Cache memory 202 by its associated Central Processing Unit 201. With further reference to FIG. 5 of the drawings, each Central Processing Unit 201 has a Cache memory 202 connected and addresses the memory 203, 206 via the P-bus 204 for all accesses except read accesses where the content of the address is copied in the Cache memory 202. The Central Processing Units 201 multiplex the use of the P-bus 204 under control of the P-bus arbitration module 212 according to generally known principles, and the Central Processing Unit at any time having control of the P-bus 204 sends the logical address of the location to be accessed via the P-bus 204 and bus separator 209 to the memory map 208, which translates the logical address into the actual physical adress in memory 203,206 and returns the physical address via the bus separator 209 and P-bus 204 to the memory 203, or sends the physical address via bus separator 211 and memory extension bus 207 to memory 206, dependent on the addressed location being maintained in memory 203 or memory 206, respectively. During a write cycle the Central Processing Unit 201 further output the dataword to be written into the addressed memory location on the P-bus 204, the dataword being written into the addressed location in memory 203 directly from the P-bus, or in memory 206 via busseparator 209, internal bus 215, busseparator 211 and memory extension bus 207.

During a read cycle the content of the addressed memory location is presented to the Central Processing Unit 201 either directly via the P-bus 204 from memory 203 or via the memory extension bus 207, busseparator 211, internal bus 215, busseparator 209 and the P-bus.

In complete analogy with above is addressing, write and read cycles performed by address sourcing devices, such as a Direct memory access controller device 216 on the C-bus 205 replacing Central Processing Unit 210 with Direct memory access controller 216, P-bus 204 with C-bus 205, busseparator 209 with bus-separator 210 and P-bus arbitration module 212 with C-bus arbitration module 213.

With continued reference to FIG. 5 the Central Processing Unit 201 is capable of addressing a contiguous logical memory of 128K words, 1K word=1024 words. This logical memory being divided into 128 logical pages each of 1024 words, the memory map 208 in the way described above translates the logical address consisting of a logical page no. from 0 to 127 and a logical location no. from 0 to 1023 within that logical page being output from the Central Processing Unit, into an actual physical address in memory 203, 206 consisting of a physical page no. from 0–16,384 and a physical location from no. 0 to 1023 within that physical page, the physical location number being identical to the logical location number. Physical page numbers from 0 up to 1023 is contained in memory 203 and physical page numbers from 1024 up to 16,384 is contained in memory 206. The Cache memory 202 is a 1K word (1024 words) fast buffer memory containing copy of the content of the most recent addressed locations in memory 203 by the connected central processing unit 201, the Cache memory is addressed by the connected Central Processing Unit 201 logical location number within a logical page independently of the logical page number, or from the memory map 208 via internal bus 215, busseparator 209 and P-bus 204 by the physical location number within a physical page independently of the physical page number.

FIG. 7 illustrates this many to one correspondence principle of the Cache memory 202 when addressed by the Central Processing Unit 201.

Each location in the Cache memory shown in FIG. 8 contains beyond the data content 232 of a copied corresponding location number from the memory 203 also stored, as shown in FIG. 8 the logical page number 230 and physical page no. 233 of the copied location in memory 203 and a valid entry bit 231 indicating that the content of that location in the Cache memory is valid.

Referring to FIG. 8 a Central Processing Unit 201 read operation to a location in memory 203 on the P-bus 204 is started by investigating if content of that location is copied in the Cache memory before accessing the P-bus 204, the Central Processing Unit 201 addresses the Cache memory 230, 231, 232 and 233 by logical location no. through selector 241, logical page number 230 of the addressed location is compared in comparator 234 with the Central Processing Unit 201 issued logical page number, successfull comparison and a set valid entry bis 231 of that location together with the Central Processing Unit read signal is tested by AND gates 235, 237 to output a HIT signal indicating that a copy was found in the Cache memory. The HIT signal presents the copy of the addressed dataword from memory 232 via buffer 236 to the Central Processing Unit 201, which ends the read operation without accessing the P-bus 204.

If the result of the investigation was not a HIT signal on the output of AND gate 237 the Central Processing Unit 201 continues into a normal read cycle on the P-bus 204 as described in the foregoing including translation of logical address from the Central Processing Unit 201 to physical address by the memory map FIG. 5, 208. The Cache controller 246 stores the dataword received by the Central Processing Unit 201 via the P-bus 204 from memory 203 into Cache data word memory 232, the physical page number on the P-bus 204 into Cache physical page memory 233, and logical page number from the Central Processing Unit 201 into Cache logical page memory 230 and sets the valid entry bit in Cache valid entry memory 231, all stored into the location pointed at by the Central Processing Unit logical location number via selector 241.

Again referring to FIG. 8 a write operation of the Central Processing Unit 201 into memory 203 follows exactly the same procedure as given above for a read operation into a location in memory 203 when not having a copy of the addressed memory location in the Cache memory, and the result is thereby also updating of the Cache memory with a copy of the content written into the addressed location in memory 203.

In order to ensure that copied datawords in the Cache memory always reflect the exact content of the corresponding location in memory 203, also in the case other address sourcing devices on the P-bus 204 or C-bus 205 than the connected Central Processing Unit 201, writes into these locations in memory 203, the P-bus 204 and C-bus 205 are having their Physical location number of write access on these busses 204, 205 used for addressing via selector 241 the physical page number memory 233, outputting the physical page number stored in that location to the comparator 238 where it is compared with the physical page number on the P-bus 204 or the C-bus 205, respective of which is accessing memory 203, if an identical physical page number indicating that the address in memory 203 corresponds to a copied one in the Cache memory, the output of the comparator 238 is gated together via AND gate 239 with the write signal from OR gate 247 indicating write on C-bus 205 or write other than from connected Central Processing Unit 201 on the P-bus 204 coming from NAND circuit 240 negating the connected Central Processing Unit write signal from the P-bus 204. The output of AND gate 239 together with output of the addressed location in valid entry memory 231 is gated through AND gate 248 to give a collision signal to the Cache controller 246 making this reset the addressed valid entry bit in valid entry memory 231 thereby deleting the content of the addressed location in the Cache memory.

INTERMEMORY NETWORK SYSTEM

The function of the intermemory network shown in FIGS. 1–4 will now be more fully explained in connection with the link adaptors which interface the intermemory network via direct memory access controllers (17 FIG. 2) to the C-bus of the central processing unit system.

In the preferred embodiment of the invention each intermemory communication link (e.g. 21 FIG. 2) comprises two cables, a dataline 301 and a respond line 302, see FIG. 9. Each cable contains a twisted pair of wires for serial bit transferring of data between a plurality of link adapters denoted 0,1 . . . N of different central processing unit systems. The data bits are typically transferred at 16 MHz and resistors R are arranged for impedance matching of the cables.

It must be understood, that a condition of interconnecting many link adaptors to a cable, is that the cable is galvanic insolated from the linkadapters. For that reason each link adapter comprises transformers 303, 304 (see also FIG. 10) for interconnecting a respective cable and a transceiver in an intermemory link adapter to be described below.

FIG. 10 shows a block diagram of an embodiment of the intermemory link adapter according to the invention said adapter being interfaced to a direct memory access controller common to a plurality of link adapters via a bus 311.

The link adapter shown in FIG. 10 comprises two transceivers 312,313 each being connected to a receive circuit 314 and to a transmit circuit 315 for serial to parallel conversion of data from the transceiver 313 to a receive buffer 316 and for parallel to serial conversion of data from a transmit buffer 317 to the transceiver 313, respectively.

The said buffers are connected to the bus 311 and being controlled by a receive state controller 318 and a transmit state controller 319, respectively. The transceiver 312 is connected to registers 320, 321 to be more fully described in the following explanation of the arbitration principle of the link adapter using the associated intermemory communication link.

The bus 311 is further connected to status registers 322, 323 communicating with the receive state controller 318 and transmit state controller 319, respectively. Assuming that the direct memory access controller being informed that the transmit buffer 317 is empty by testing the status register 323, the said controller may transfer a datablock to the transmit buffer 317 and shift the status of the register 323 to indicate that the buffer 317 is full thereby enabling the transmit state controller 319 for an arbitrating cycle to be more detailed explained later with reference to FIG. 11.

The arbitrating cycle implies that a message at one time will be given to the transmit buffer 317 to initiate read out from the buffer to the data line 301 (FIG. 9) if that line is silent. Concurrently with the data read out, data are transferred to a cyclic redundancy check generator 324 and the 4th byte of the data block is latched in a register 325. If at least four bytes are received valid by a predestinated receiving link adapter the transmitting link adapter will receive said 4th respond byte via line 302 (FIG. 9) and the transceiver 312 to the register 321. The content of the registers 321,325 is compared in a comparator 326 and if data are equal, the transmit state controller is allowed to continue data read out, from the buffer 317. When the transmit buffer 317 is empty the transmission will be terminated with transmission of check bytes from the generator 324 and the register 323 will be shifted to indicate empty transmit buffer. If data compared by the comparator 326 are unequal the transmit state controller 319 will be ordered to stop the read out from transmit buffer 317 and to initiate a new arbitrating cycle while the register 323 still indicates full transmit buffer.

The intermemory link adapter in FIG. 10 is ready to receive data via the dataline 301 (FIG. 9) and the transceiver 313 whenever the register 322 indicates that the receive buffer 316 is empty. Data are received by the receive circuit 314 for routing data to the generator/checker 324 and in parallel form to the recieve buffer 316 and the 4th byte thereof to the register 320 for initial transmitting of the 4th byte via the transceiver 312 and the respond line 302 (FIG. 9) to the sending link adapter, compare with the preceeding remarks. When the receive buffer 316 is full and no errors have been detected by the checker 324 the status of register 322 will be shifted to indicate full buffer. Being informed by the status register 322 the direct memory access controller may fetch the data block in the receive buffer 316 and thereafter shift the status of register 322 to indicate empty buffer.

With reference to FIG. 11 will the aforementioned arbitration cycle now will be described. FIG. 11 shows a transmission timer circuit incorporated in the transmit state controller 319 from FIG. 10. To be short the timer circuit is seen to comprise a count down counter 331, a free running counter 332, a programmable read only memory 333 also shown in greater details in the bottom of FIG. 11, a further count down counter 334, a flip flop 335, a delay circuit 339 and AND gates 336,337,338. To explain the operation of the timer circuit a line silent signal is needed, said signal being produced by a not shown detector-circuit when the data line is detected to be silent (no transmission on data line).

When the status register 323 is shifted to indicate full transmit buffer the timer circuit are waiting, until silence on the dataline is detected. Upon line silent a signal IAC will be produced via the AND gate 338 and the delay circuit 339. The IAC signal will be delayed 2us due to propagation delay along the data line. The IAC signal resets flip flop 335 and enables the counter 334 to receive a number from the memory 333 as explained below. The counter 334 starts to count down from the said number in accordance with a clock signal. When the bits in the counter 334 are all zero an output signal is produced to the AND gate 337 and if the data line is still silent the AND gate 337 sets the flip flop 335 to produce a STD-signal (start transmission of data block). If the data line was busy no transmission of data blocks will be initiated, and the above described procedure will be repeated next time the data line is silent. The IAC signal also controls the counter 331, said counter being set to all ones, first time a IAC signal occurs. The output signals from the counters 331 and 332 constitute the address input signal to the memory 333, the content of a memory location being loaded into the counter 334 by the IAC-signal.

During the first arbitration cycle the d-output from the counter 331 will be d=15 while the r-output from the free running counter 332 will be a number between 0 and 15. Assuming that d=15 and r=1 the number F241 will be loaded into the counter 334, this number representing an actual time delay of initiating the transmission of data blocks provided that the data line is silent.

The content of the 256 memory locations of the memory 333 is preloaded according to a scheme wherein the most significant bits represent a fixed number for each value of d said number decreasing from a maximum value when d=15 to zero when d=0 and wherein the least significant bits represent a number being random for each memory location. The least significant bits might represent a fixed number assuming that two free running counters 332 in different central processing unit systems would not be synchronized and simultaneously generate the same value of r. This would imply that different link adapters could initiate a read of data simultaneous to the dataline. To prevent such a situation the least significant bits in the memory locations represent the aforementioned random number. The time delay represented by the content of the memory locations is of course dependent of the clock rate of the counter 334. The content may typically vary between 0 and 75 corresponding to a maximum time delay of 7.5us when the clock rate is 10 MHz. Every time a time-to-transmit has failed or the transmission has been stopped by the comparator 326 a new IAC-signal will be produced and cause the counter 331 to be decremented. Due to the decreasing value of the most significant bits in the memory locations (considered from the bottom to the top of the memory) the time delay produced by the counter 334 implies, that a link adapter having failed several times will obtain preference in relation to link adapters having failed a few times. It will be understood, that a link adapter may be given a predetermined priority over other link adapters connected to a common data line by loading lower d values in the memory 333 of that link adapter in relation to the d values of the other link adapters.

Referring back to FIG. 10 the 4th byte to be compared by the comparator 326 is chosen in accordance with the signal propogation delay to the outermost end of the intermemory communication link so that all detectors for detection of silence on that link have the opportunity to detect the link to be busy before transmission of the 4th byte.

In consequence of the separate respond line (302 FIG. 9) for each intermemory communication link of the invention it is possible to stop a transmission of a data block at a very early state so that the dataline will not be busy because of a data transfer predestinated to a full receive buffer or being disturbed by collision with another data transfer. If the receive buffer is full the 4th byte will not be received in the register 321 and if a collision is present the 4th byte will be disturbed so that the comparator 326 will stop the transmission in any case. The transmitted data block comprises preferably 261 bytes and it can therefore be recognized, that the described arrangement yields a remarkable utilization of the intermemory communication link in that failed data transfers will occupy the link only a very little fractions of time.

DIRECT MEMORY ACCESS I/F CONTROLLER TO INTERMEMORY COMMUNICATION NETWORK

With reference to FIG. 12 showing the Direct Memory Access Interface Controller 352 for transferring data between the Central Processing Unit system 371 memory and the Intermemory link adapters 361. The Direct Memory Access interface controller is centered around two internal busses the HI-BUS 351 and the CI-BUS 350. The HI-BUS connects Ingoing processor 341 and Outgoing processor 342 with control memory 343, Intermemory link adapters 361 and the CI-BUS, arbitration of HI-BUS access between the address sources being performed by the HI-BUS arbitrator 344. The CI-BUS interconnects Ingoing DMA 345, outgoing DMA 346, HI-BUS 351, C-BUS 205, status register 349 and the Interrupt controller 348, arbitration of CI-BUS accesses between the address sources being performed by the CI-BUS arbitrator 347. The Ingoing processor 341 comprising CPU 364, program storage in PROM 365 and RAM 366 as working memory is a self-contained microcomputer isolated from the HI-BUS 351 when processing internally by the busseparator 360 and via the HI-BUS having access to receive buffers 362 of the intermemory link adapters 361 and the control memory 343, and by bus separator 357 and the CI-BUS to Ingoing DMA 345, status register 349 and the interrupt controller 348, and further via bus separator 354 and the C-bus 353 access to MAP translation memory FIG. 5, 208 of the central processing unit system 371 to which the Direct Memory Access I/F controller is attached. The task of the ingoing processor 341 is to scan the receive buffers 362 of the intermemory link adapters 361 and on finding one having received a datablock FIG. 13, 382 transferred into it from the intermemory communication network 370 to analyze the first 5 byte header FIG. 13, 380 based on control information found in control memory 343 to set up ingoing DMA 345 to transfer the data part of the Datablock in the receive buffer 362 into the specified databuffer in memory of the central processing unit system 371. Further the ingoing processor 341 also handles signal blocks FIG. 13, 381, received from the intermemory network 370 in receive buffer 362 of the intermemory link adapters 361, signal block indicating that the central processing unit system sending it over the intermemory network wants to communicate with the central processing unit system 371 via a yet not specified datastream, the ingoing processor 341 stores the number of the received requested datastream in the status register 349 and interrupts the central processing unit system 371 via interrupt controller 348 for allocation of memory buffers for the communication and specification in control memory 343 of the datastream by a stream descriptor FIG. 14, 801, without which the ingoing processor 341 will ignore incoming data on that datastream from the intermemory network.

With reference to FIG. 12 comprising the outgoing processor 342 CPU 367, program storage in PROM 368 and RAM 369 as working memory is as the ingoing processor a self-contained microcomputer isolated from the HI-BUS 351 by bus isolator 359 when processing internally, and via the HI-BUS having access to transmit buffers 363 of the intermemory link adapters 361 and the control memory 343, and by bus separator 357 and the CI-BUS 350 to outgoing DMA 346, status register 349, Interrupt Controller 348 and further via busseparator 354 and the C-bus 353 access to MAP translation memory FIG. 5, 208 of the central processing unit system 371. The task of the outgoing processor 342 is to handle outputting of datablocks on active datastreams from the memory buffers in the central processing unit system 371 to empty transmit buffers 363 in the intermemory link adapters 361, by analyzing the stream descriptor FIG. 14, 801 in stream descriptor memory FIG. 14, 373 specifying a datastream, the outgoing processor FIG. 12, 342 sets up outgoing DMA 346 to transfer the datapart FIG. 13, 383 of a datablock to be communicated to the intermemory communication network FIG. 12, 370, from memory of the central processing unit system 371 to an empty transmit buffer 363 in an intermemory link adapter 361 connected by its associated intermemory link with the destination central processing unit system as specified in the network configuration memory 375, also based on the information in the stream descriptor the outgoing processor 342 directly loads the 5 byte header FIG. 12, 380 into transmit buffer 363 of the selected intermemory link adapter 361.

The communication protocol ensuring error free communication on a datastream between central processing unit systems via the intermemory communication network is jointly executed by the ingoing processor 341 and the outgoing processor 342 cooperating with the corresponding ingoing processor and outgoing processor at the other end of the datastream via the intermemory communication network, with variables relating to the communication protocol processing being stored in the intermediate result area FIG. 14, 809 of the stream descriptor 801 specifying the datastream at each end.

Data is transferred over the intermemory communication network in packets consisting of one or more datablocks. To transfer a packet over the intermemory network without error on a datastream being specified by a stream descriptor FIG. 14, 801 in both stream descriptor memories FIG. 12, 373 in Direct Memory Access Interface Controllers 351 of two central processing unit systems connected via the intermemory communication network; packet control and status information is sent in both directions contained in control byte FIG. 13, 384 of datablocks FIG. 13, 382 being transferred in both directions on the specified datastream. Each specified datastream is controlled by separate communication protocol independently of all other datastreams, the following refers to a single datastream.

With reference to FIG. 15, for each packet there is an outputter 830 at the end of the datastream that originally had the packet and an inputter 833 at the other end that finally gets the packet. These terms must be distinguished from "sender" and "receiver" which are used in the conventional way to distinguish the two ends of a single transmission, for a control byte FIG. 13, 384 sent in one direction may contain information about a packet output in the other direction.

Because the datastream is full duplex (but not necessarily the same speed in each direction) for output and input as well as for sending and receiving, two packets may be transmitted independtly and simultaneously in opposite directions over the datastream.

A packet consists of one or more datablocks, the datablocks within a packet is contiguously numbered modulo 8, transmitted in byte 4 FIG. 13, 385 of the datablock header, starting with zero for the first datablock in the packet. The first and the last datablock FIG. 13, 382 in the packet contains a control byte which indicates the begin and end of the packet, as well as the output phase (0 or 1) of the packet.

With reference to FIG. 15 completeness of a received packet is ensured by the inputter 833 through contiguous numbered (modulo 8) datablocks between the first and the last datablock in the packet. All errors will result in datablock being rejected at the receiving station, errors are therefore detected by the protocol by the following datablock arriving out of sequence (or time out by receive timer FIG. 14, 806, if last frame in packet), the complete packet is rejected immediately (without waiting for completion of packet) and retransmission requested by inputter 833, by replying Not ACknowledged, NAK is the control byte FIG. 13, 384 of a datablock transmitted in the opposite direction on the datastream. The packet phase indicated in the first and last frame of a packet is also checked, if it is n+1 (modulo 2), where n was the last packet accepted it is accepted via ACKnowledge, ACK by inputter 833 in the control byte FIG. 13, 384 of a datablock in the opposite direction on the datastream. If it is n, it is accepted via ACK, but it is thrown away by the inputter 833 since it must have been duplicate transmission caused by an error in one of the acknowledgements.

ACK/NAK is transmitted by the inputter in the communication control byte. The control byte FIG. 13, 384 is transmitted either contained in a datablock in a packet going from the inputer (any datablocks: first, last or in the middle of packet) or initiates sending of a datablock, outside packets, containing no data and which is discarded by the outputter 830 except for the content of the control byte FIG. 13, 384, this allows for immediate ACK/NAK response by the inputter 833 to a packet received from the outputter 830.

At the Outputter 830 each acknowledgement is also checked for errors, if erroneous it is thrown away, if error free and ACK, then packet n+1 is transmitted, and if NAK then packet n is retransmitted. A timer FIG. 14, 803 at the transmitter initiates retransmission of packet n in case that neither ACK nor NAK is received within a specified time (e.g. lost due to error of the link), retransmission is attempted 3 times before the protocol gives up on output.

The transfer of a packet in the opposite direction in the datastream is performed identically as described above replacing outputter 830 with outputter 831 and inputter 833 with inputter 832.

The outgoing processor FIG. 12, 342 at each end of the datastream FIG. 15, 834 executing the part of the communication protocol related to the outputters respectively and ingoing processor FIG. 12, 341 at each end executing the part related to the two inputters respectively.

With reference to FIG. 1 communication over the intermemory communication network between two central processing unit systems is done by specifying a datastream between the memories of the central processing unit systems, a datastream when specified will transfer data content of a buffer in memory of a first central processing unit to a buffer in memory of a second central processing system, and in the opposite direction from a memory buffer in the second central processing unit system to a memory buffer in the first central processing unit system. Referring to FIG. 2, in the present embodiment of the invention, each of the up to 4 DMA I/F controllers 17,18 in a central processing unit system, provides for up to 256 datastreams being specified to each of the up to 15 central processing unit systems communicated with via the intermemory inter-communication network, giving a total of up to 16,128 possible independent datastreams being specified (by stream descriptors), from a central processing unit system via the intermemory communication network to other Central Processing Unit systems, and dependent on the configuration a Central Processing Unit system can communicate with up to 60 other central processing systems the possible datastreams are identified by 16 bit where 8 bit identifies each of the two communicating central processing unit systems by a 4 bit number, and the last 8 bit indicates that one of 256 possible streams between these used. Data blocks transferred between the intermemory communication network and the central processing system is multiplexed between the specified datastreams by DMA I/F controllers 17,18, with an accumulated data transfer capacity of 400K byte/sec of each DMA I/F. It is an important feature of the invention that the large number of possible datastreams and high transfer capacity, allows for specifying datastreams directly between data areas in memory of software processes in different central processing units with a need to communicate with each other, instead as is done in the present state of the art having only a few memory buffers allocated for central processing unit system to central processing unit system communication, and thereafter having to multiplex the use of these few buffers between software processes needing to communicate, this multiplexing being done by software and thereby putting a heavy load on the central processing units. Also it is an important feature that a datastream can be specified directly between a first memory FIG. 22, 608 in a central processing unit system accessible by a peripheral processor FIG. 22, 607 in and a similar second memory in another central processing unit system accessible by another peripheral processor, and that the datastream can be specified to continuously transfer the content of a memory buffer in the first memory buffer to a memory buffer in the second memory and vice versa, each time transferring the content of the memory buffer without interruption of the central processing units and after completed transfer, restart transfer of the content of that memory buffer, this allows for continuous communication between peripheral processors via the intermemory communication network without overhead on the central processing units after having intially specified the datastream. In a communication system incorporating the multiprocessor computer of this invention where the peripheral processors transmit and receive data via external telephone lines the above feature is important for switching data between any such telephone lines being connected to the communication system via the intermemory communciation network without loading the central processing units of the multiprocessor computer.

An important feature of the invention is that a datastream between two separate central processing unit systems is specified by each central processing unit system entering a stream descriptor FIG. 14, 801 in the control memory of one of their connected Direct memory Access I/F controllers FIG. 12, the stream descriptor FIG. 14, 801 defines the memory buffers and control information to be used with that datastream in the central processing unit system. Datastreams are not initially specified between central processing unit systems but dynamically generated and specified, by a central processing unit system initially entering a stream descriptor FIG. 14, 801 in the control memory FIG. 12, 343 of one of its connected Direct memory Access I/F controllers FIG. 12, specifying the other central processing unit system to be communicated with, datastream number, and amount of data to be transferred, but no memory buffers for input and output of data. This generates a request signal block FIG. 13, 381 containing data of the tentatively specified datastream to be sent via the intermemory communication network to the specified central processing unit system. If the central processing unit system receiving the signal block accepts to communicate with the originating central processing unit on the indicated datastream number, it enters a corresponding stream descriptor FIG. 14, 801 in the control memory FIG. 12, 343 of one of its connected Direct Memory Access I/F controllers, but now pointing to memory buffers for input and output of data, the stream descriptor will initially send a signal block as above in the opposite direction with amount of data to be transferred in that direction and afterwards the stream descriptor will be ready for normal data-transfer. The originally initiating central processing unit system in response to the received signal block enters a stream descriptor defining memory buffers for input and output in one of its Direct Memory Access Controllers. The datastream is now said to be specified and transfer of data between the specified buffers in memory of the two central processing units systems via the intermemory communication network is autonomeously handled by the associated Direct memory access I/F controllers until the buffers has been completely transferred whereafter the Direct memory access I/F controllers interrupt their associated central processing unit systems for closing the datastream by deleting the corresponding stream descriptors in their control memory FIG. 12, 343.

FIG. 14, illustrates the function of the different elements of a Direct Memory Access I/F controller working in combination to initiate a datastream and transferring data via the datastream between memory of a first central processing unit system and the intermemory communication network in cooperation with a corresponding direct memory access I/F controller and memory of a second central processing unit system at the other end of the datastream.

With reference to FIG. 14 a first central processing unit system initiates the set up of a datastream by loading a stream descriptor 801 into the stream descriptor memory 373 of one of its connected Direct Memory Access I/F controllers with the INIT bit set 802, bit 8, number of the datastream to be initiated in 802 bit 0–7, 1111 (indicating signal block) into datatype 803 bit 12–15, number of the destination central processing unit system in 803 bit 8–11, send timer value in 803 bit 0–7, and length in bytes of the memory buffer in the central processing unit system to be transferred to the destination central processing unit system in 810 bit 0–16. Further a word containing the begin address of the stream descriptor is entered into an area in the scan memory 372, corresponding to one of the 16 speed levels. The outgoing processor 342 scans through the scanmemory 372 fetching a word and performs the processing indicated by the pointed at stream descriptor and then goes on to the next word and pointed at stream descritor, in such a way that words in the scanmemory entered in the scanmemory at one speed level is fetched twice as often as a word entered at the next lower speed level. As it is seen in the following, processing by the outgoing processor of a stream descriptor normally will lead to transfer of a data block on the corresponding data stream, the speed level area that the pointer word is entered into in the scanmemory defines the speed, with which data is transferred on datastream. Fetching the word in the scanmemory pointing at the stream descriptor described above, the outgoing processor as a result of the INIT bit set, 802 bit 8, transmit a signal block FIG. 13, 381 to the intermemory communication network in the following way: using the number of the destination central processing unit system it finds in the network configuration memory 375 those of its attached intermemory link adapters that are connected via an intermemory link with the destination central processing unit system and finding one of these with its transmit buffer 363 empty. It now loads the found transmit buffer 363 with the content of the signal block 381 in as follows datatype 1111 and destination central processing unit number contained in stream descriptor 803 bit 8–15 into byte 1, datastream 802 bit 0–7 into byte 2, all zeros into byte 3, 0001 in the 4 most significant bits of byte 4 and number of the central processing unit from stream descriptor 806 bit 8–1 into the 4 least significant bits of byte 4 as the source of the transmission, 00000001 into byte 5 to indicate two following data bytes and length of outgoing transfer 810 bit 0–16 into byte 6 and 7, having now completely loaded the content of the signal block to the intermemory link adapter, outgoing processor 342 initiates transfer to the intermemory network by setting the transmit buffer full in the intermemory link adapter status register FIG. 10, 323. Further the DONE bit in stream descriptor 802 bit 10 will be set to indicate that signal block has been processed for transmission and the value in send timer 803 bit 0–7 decremented. Each time thereafter the stream descriptor is scanned by the outgoing processor due to the DONE bit being set only the send timer value is decremented, and if reaching zero indicating that the further actions described below in setting up the datastream has not been performed within the set time, the outgoing processor interrupts the Central processing unit system via interrupt controller 348 indicating datastream number 802, bit 0–7 and destination central processing unit system 803 bit 8–11, and the error cause in status register 349, as well as stops the stream descriptor from further processing by removing its pointer word in the scanmemory 372.

In the Direct Memory Access I/F controller of the central processing unit system specified as destination of the above signal block, the ingoing processor 341 scans continuously its connected intermemory link adapters for having their receive buffer full, and upon finding the signal block in a receive buffer, processes it. The datatype in byte 1 being 1111 indicates that it is a signal block, the ingoing processor loads the status register 349 with the received data stream number contained in byte 2, number of source central processing unit system contained in the 4 least significant bits of byte 4 and length of outgoing transfer contained in byte 6 and 7 and interrupts the central processing through interrupt controller 348. The central processing unit system as a result of the interrupt fetches the content of status register 349 and either ignores the request to set up the datastream or based on the forwarded length of outgoing transfer allocates a receive buffer in its memory of that size and load the Direct Memory access I/F controller with a corresponding stream descriptor in stream descriptor memory 373 and data buffer links in data buffer link memory 374 specifying its end of the datastream the function of which is described in detail in the following. Also it will define length in bytes of an eventual memory buffer in its memory to be transferred in the opposite direction on the datastream in the stream descriptor length of outgoing transfer word 810 and set respond bit, RESAP 802 bit 9 and enter a pointer word to the stream descriptor into the scan memory 372 on a specified speed level. When through the scanning by outgoing processor 342 the stream descriptor are selected for processing a signal block with datatype 1111 in byte 1 independtly of content of stream descriptor word 803 bit 12–14, is generated for transfer in the opposite direction due to the RESP bit being set, in similar way as previously described with the exception that the RESP bit is reset instead of the DONE bit set indicating that the stream descriptor is now specifying transfer of data blocks, in and out of the central processing unit memory on the requested datastream as neither the INIT, RESP or DONE bits are set in descriptor word 802 bits 8,9,10.

The originally requesting central processing unit receives the signal block in similar way as above and in response to the interrupt allocates a receive buffer of the size indicated in the length of outgoing transfer FIG. 13, 381 byte 6,7 of the signal block and conveyed through status register 349, and stores stream descriptor in stream descriptor memory 373 and data buffer links in data buffer link memory 374 accordingly specifying the datastream at the other end, and enters a pointerword to the streamdescriptor in scanmemory 372 at a specified speed level. The datastream between the two central processing unit systems are now specified, and transfer of data between memories of the central processing unit systems takes place as described in the following and are similar in both Direct Memory Access I/F controllers at each end of the datastream. Each time the stream descriptor 801 comes up for processing through the scanning of the scan memory 372 by outgoing processor 342, the outgoing processor as previously described finds an empty transmit buffer 363 in a connected intermemory link adapter and loads the following bytes forming the 5 byte header FIG. 13, 380 of the data block to be transmitted from stream descriptor 801, with reference to FIG. 14 datatype (different from 1111) and destination central processing unit system no. from word 803 bits 8-11 into byte 1, word 802, bits 0-7 containing datastream no. into byte 2, control byte according to the previously described communication protocol from intermediate result area 809, cyclic sequence no. from intermediate result area 809 into the 3 most significant bits of byte 4, sets bit 4 in byte 4 if data follows and source central processing unit number from word 806, bit 8-11 into 4 least significant bits of byte 4, byte 5 is loaded with number of databytes minus 1 following the 5 byte header 384 as calculated below. Using stream descriptor word 805 containing address of current data buffer link in output packet as pointer, the outgoing processor gets access to a data buffer link 816 pointing to the locations in central processor unit systems memory where next data is to be transferred from the data buffer links 815, 816, 817 comprises 5 words of 16 bit, first word 818 contains the physical page no. in memory where data is located together with the associated protection bits, second word 819 contains address in above physical page where next dataword is to be fectched from, and third word 820 remaining bytes within the physical page of the buffer, fourth word 822 the original size in bytes within the physical page of the buffer, fifth word 821 the address of the next databuffer link in databuffer link memory 374 or end of output packet indicated by most significant bit being 1 or end of transfer indicated by content being 0. The outgoing processor 342 first investigates if bytecount word 820 is zero indicating as described below that next data buffer link, word 821 contains either end of packet or end of transfer (also end of packet), outgoing processor then investigates stream descriptor intermediate result area 809, if Acknowledge, ACK has been received from the other end of the datastream for that packet, then if not end of transfer, outgoing processor 342 loads address of next databuffer link word 821 into stream descriptor word 805 and 806 and progresses as described below. If at the end of transfer the central processing unit is notified that outgoing transfer of data is completed by interrupt through interrupt controller 348 and status register 349, If stream descriptor intermediate result area contained Not Acknowledge NACK received from the other end of the datastream, then the address of first data buffer link in output packet in stream descriptor word 804 is loaded into address of current data buffer link in output packet word 805, preparing for retransmission of the packet, also outgoing processor restores content of data buffer address word 819 and byte count 820 utilizing content of data buffer length word 822 of all data buffer links and progresses as described below. If neither ACK or NACK the send timer stream descriptor word 803 is decremented, if not zero, the outgoing processor fetches a new pointer in the scan memory and starts processing next stream descriptor, if zero, action is as described above for NACK.

If the byte count word 820 is not zero the outgoing processor 342 loads first word 818 of current data buffer link 815 containing physical page no. and access protection bits to the Memory Map translation memory FIG. 9, 468 in location being used when translating from addresses generated by the outgoing DMA 346 and loads data buffer address 819 and bytecount 820 to the outgoing DMA 346, outgoing DMA transfers the specified datawords from the memory of the central processing unit system, to the transmit buffer of the intermemory link adapter, incrementing data buffer address and decrementing byte count for each word transferred until either bytecount reaching zero or 256 bytes has been transferred, the outgoing processor 342 stores the new data buffer address and bytecorunt from outgoing DMA 346 in data buffer link word 819 and 820, if byte count equals zero, the next databuffer link word 821 is investigated and if pointing to a further data buffer link, word 821 is stored into stream descriptor word 805. If the next databuffer link word 821 indicates end of packet or end of transfer (also being end of packets) the control byte, byte 5 in the data block FIG. 13, 382 is already positioned in transmit buffer 363 of the selected intermemory link adapter, modified to communicate this to the other end of the datastream, send timer is loaded in word 803, bit 0-7 to time out if acknowledge ACK is not received from the other end of the stream within specified time, but the address of current data buffer link in output packet stream descriptor word 805 is not changed. Transmission of the completed datablock is initiated by outgoing processor setting the transmit buffer full in statusregister FIG. 10, 323 of the intermemory link adapter, and outgoing processor accesses the scanmemory 372 for a pointer to next stream descriptor to be processed.

The ingoing processor 341 continuously scans the status register FIG. 10, 322 of the connected intermemory link adapters, a received datablock being flagged by status register full indication. Using the data stream number in byte 2 and source central processing unit number in 4 least significant parts of byte 4 of the received data block as pointer to the associated stream descriptor 801 in stream descriptor memory 373. The ingoing processor tests that the received sequence number, most significant 3 bits of byte 4 in the data block FIG. 13, 382, has been incremented by one modulo 8 from the previously received data block on the data stream, if not, a NACK is stored in intermediate result area 809 for later transmission by the outgoing processor and further processing of the data block is stopped by setting status register FIG. 10, 322 of the intermemory link adapter to empty and resume scanning for full receive buffers in the intermemory link adapters, if received sequence no. was incremented correctly. The ingoing processor stores the control byte possibly containing ACK or NACK of packet transferred out by the outgoing processor, byte 3 of the data block in the intermediate result area 809 of the stream descriptor 801.

If end of packet is indicated in the received control byte, byte 4 of data block FIG. 13, 382 ingoing processor stores ACK for the packet in intermediate result area 809 for later transmission by the outgoing processor. Using stream descriptor word 808 containing address of current data buffer link in input packet as pointer, the ingoing processor gets access to the data buffer link pointing to the locations in central processor unit system memory where received data is to be transferred into. The data buffer links 829, 830, 817 comprises 5 word of 16 bit as previously described. To transfer the data block received in intermemory link adapter receive buffer 362 to memory of the central processing unit system, the ingoing processor load data buffer address word 825 and byte count 826 to the ingoing DMA 345, and further the ingoing DMA is loaded with content of byte 5, of the received data block FIG. 13, 382 incremented by one, indicating actual number of data bytes contained in received data block, first word 824 of the current data buffer link 830 containing physical page no. and access protection bits are loaded into the Memory map translation memory FIG. 9, 468 in location being used when translating from addresses generated by the ingoing DMA 345, ingoing DMA 345 now starts transferring data words from receive buffer of the intermemory link adapter to the memory of the central processing unit system, incrementing data buffer address and decrementing byte count and actual received byte count for each word transferred until either received actual byte count reaches zero and all received data has been transferred to memory, or byte count reaches zero indicating that further buffer in memory is needed, this is provided for by ingoing processor accessing the address contained in next data buffer link word 828 loading stream descriptor word 808 with the content and using it as pointer to the next data buffer link pointing to further memory buffer locations, and loads data buffer address 825 and byte count 826 of that data buffer link into ingoing DMA 345, and continues data transfer until actual byte count in ingoing DMA 345 is zero, whereafter the data buffer address and byte count from ingoing DMA 345 is stored into word 825 and 826, ingoing processor now sets status register FIG. 10, 322 of the intermemory link adapter to empty and resumes scanning for full receive buffers of intermemory link adapters. In the case that a packet start is received in the control byte, byte 5 of a datablock FIG. 35, 382 on a datastream in the middle of a packet of datablocks indicating retransmission of that packet, the ingoing processor restarts inputting data of that packet to memory of the central processing unit system, by loading address of first data buffer link in input packet, stream descriptor word 807 into address of current data buffer link in input packet word 808, ingoing processor also restores databuffer address word 825 and byte count 826 utilizing content of data buffer length word 827 of all data buffer links and progresses data transfer from receive buffer 362 of intermemory link adapter to memory of central processing unit system as described above. Further each time a datablock is received on the datastream ingoing processor loads the receive timer in stream descriptor word 806, bit 0-7, the receive timer is decremented and tested by the outgoing processor each time the stream descriptor is scanned and if zero a NACK is transmitted in the control byte of a datablock transmitted on the datastream.

On receiving end of transfer indication in the control byte, byte 3 of a received datablock FIG. 13, 382, the ingoing processor informs the central processing unit system of completion of transfer by interruptitng through interrupt controller 348 and storing cause in status register 349.

The central processing unit system waits for interrupts indicating completion of transfer of both the ingoing and outgoing part of the datastream and closes the datastream when both completed by deleting pointerword to the stream-descriptor in scanmemory 372.

When the rotate bit ROT, stream descriptor word 802 bit 11 is set, outgoing processor reaching a next databuffer link word 821 containing end of transfer will restore data buffer links as previously described and load address of first buffer link in output packet, stream descriptor word 804 into Address of current data buffer link in output packet, stream descriptor word 805 and thereby continuously transmitting the memory buffer in the central processing unit system pointed at by the data buffer links comprising the output packet, likewise ingoing processor receiving end of transfer in the control byte of a datablock will restore databuffer links as previously described and load address of first data buffer link in input packet, stream descriptor word 807 into Address of current data buffer, stream descriptor word 808, in input packet thereby continuously overwriting the memory buffer in central processing unit system memory pointed at by the data buffer links comprising the input packet. Having the rotate bit ROT set in stream descriptor at both end of the datastream provides for continous communication between two peripheral processors via the intermemory communication network by continuously transferred send memory buffers and continuously overwritten receive memory buffers.

MEMORY MAP, INTERRUPT PROCESSOR AND INTRAMEMORY DMA

The physical memory of a Central Processing Unit system shown in FIGS. 1, 2, 3, 4, 5 has a total addressable size of up to 16 Megawords (16,000K words, each K word equals 1024 words) each word being 16 bit +2 parity bits for detection of single bit errors. The physical memory is divided into contiguous pages each comprising 1K word (1024 bits) numbered from 0 to 15,999, with page zero starting at location zero in physical memory.

All accesses to memory by address sourcing devices: with reference to FIG. 5, Central Processing Units 201, Direct Memory Access controllers 216 and with reference to FIG. 11, Intra Memory DMA CTRL. 13, are done to a logical address space of 128K word being separate for each address sourcing device. With reference to FIG. 16 the logical address space 490 of an address sourcing device is shown, consisting of two segments 495, 496 each of 64 pages of 1K word corresponding to an address range of seventeen bits logical address from the address sourcing device, the seventeenth bit defining which of the two segments to be used. For a Central Processing Unit logical address space, the first segment 495 is used exclusively for containing program code and the second segment 496 containing data. For a Direct Memory Access device logical address space the first segment 495 is containing the address space used when device is reading from memory and the second segment 496 containing the address space used when writing to memory. There is required no correspondance between a logical address space and a physical address space. The address translation FIG. 16, 492 of the memory mapping system of the invention translates between contiguous logical pages and any arrangement of corresponding physical pages in the memory.

Each address sourcing device having its own private logical address space and mapping, provides protection between users in the multiprocessing and multiaccessing environment of the present invention, by insuring that one user cannot read or write into the memory space of another user. Also as will be seen from the following the memory map contains translation tables for 32 complete logical address spaces, each as shown in FIG. 16, 490 allowing fast change to a new logical address space when the user of an address sourcing device (Central Processing Unit or Direct Memory access device) is changed, providing separation between users in the multiprogramming and multiusing environment. Further each page in physical memory has associated with it two access control bits in the translation table of the memory map indicating if reading, writing or, no access or page absent is allowed into locations of that page in memory. The access control bits are checked by each address translation of the memory map when the Central Processing Units are executing user programs (Central Processing Unit in user state), but are overridden when executing the trusted operating system software (Central Processing Unit in system state), when a Direct Memory Access device accesses memory the access control bits are always checked, if anauthorized access is attempted an interrupt to the Central Processing Units will result invoking the operating system to take action on the error. Thus separate logical address spaces of devices and users, access control of each physical page, user and system state of Central Processing Units, together with no instruction executable in user program can modify the user program, provides protection of users modifying other users or operating system programs and data. The page absent indication and interrupt when memory map translation is attempted to a physical page with access control bits set to absent page is utilized to implement virtual memory. The Operating system being started by the interrupt brings the content of the absent page from peripheral memory (Disc, magnetic tape, etc.) into physical memory and changes the translation table in the memory to allow access and restarts the user, which now have access to the previously not found locations in memory. Virtual memory thus allows the logical address spaces to be much larger than actual physical memory, because physical memory is extended by peripheral memory. Translation of the seventeen bit logical address space of an address sourcing device into the twenty four bit physical address is provided by translation table in the MAP translation memory. The translation table translates logical page number into physical page number while the address within page is unchanged from logical to physical page. This is illustrated in FIG. 17 showing the logical to physical address translation of Central processing units 201 on the P-bus and Direct memory access devices 216 on the C-bus, the memory map is multiplexed between devices, and the P-bus and C-bus, only one address sourcing device having the use of the memory map at any time. The address sourcing device 201 or 216 on either the P-bus or C-bus having control of the memory map, addresses a location in the segment RAM 460, by its device or CPU number (0–4) and for Direct Memory access devices the Read/write (R/W) line on the C-bus, and for Central processing units Prog./data (P/D) line on the P-bus. The addressed location in the segment RAM 460 provides a 6 segment number as output and address A11–A6 to the MAP translation memory 468, specifying one of the 64 segment translation tables in Map translation memory 468. Simultaneously the six most significant bits 467 of the sixteen address bits from the address sourcing device is used as address A5–A0 to the MAP translation memory specifying the logical page number within the segment to be translated, the location pointed at in the Map translation memory 468, provides as output the 14 bit physical page number 471, 470 (D13–D0), 2 Access control bits 461 (D15, D14) and parity bits 460 of the MAP translation memory location (D17, D16). The location within logical page 466 is unchanged used as location within Physical page 469. The Address translation from 17 bit logical to 24 bit physical address 472 is completed. If the physical address 472 is within the first Mword of memory, physical address bit 0–19 is reflected back on the bus of the logical address sourcing device, P-bus or C-bus respectively, to address memory FIG. 5, 203 positioned between these. If physical address 472 is between 1 and 16 Mword the full 24 bit physical address is forwarded to the memory extension bus 207 to address memory FIG. 5, 206 positioned on the memory extension bus.

Control memories, Memory map translation memories, control/status registers in a Central Processing unit system (but not part of its physical address space) can only be accessed by Privileged Read/writes, these only executable by the operating system software on a central processing unit in system state, except loading of memory map translation RAM which microcoded processors of the Direct Memory Access controllers and the Interrupt preprocessor is allowed to do based on information in their control memories. As this information was originally loaded by the operating system, the integrity of all control memories and status/control registers of the central processing unit system is thus ensured. Privileged read/writes directly addresses the control memories or control/status registers without translation by the memory map. FIG. 18 shows the different forms of privileged read/writes:

A: CPU 201 read/write in MAP translation RAM 468 (address translation tables) or MAP segment RAM 460.

B: CPU 201 read/write in Interrupt preprocessor control memory 445.

C: CPU 201 read/write in Direct memory access controller 448 control memory 449.

D: CPU 201 read/write in control memory or status/control registers of a device on the memory extension bus 209.

E: Interrupt preprocessor 446 writes in MAP translation RAM 468 or segment RAM 460 for setting up logical to physical address translation for an INTRA MEMORY DMA transfer.

F: Direct memory access controller processor 450 writes in MAP translation RAM 468 or segment RAM 460 for setting up a logical to physical address translation for a DMA transfer.

All other accesses than Privileged read/writes are to memory in physical address space of a Central Processing Unit system, and is always through the memory map of the Central Processing Unit system, FIG. 19 shows the various forms of memory mapped data transfers:

A: CPU 201: addresses memory 203

B: CPU 201: addresses memory 206 on the memory extension bus

C: INTRA MEMORY DMA 410: addresses memory 203 as Data source and Data destination.

D: INTRA MEMORY DMA 410: addresses memory 206 on the memory extension bus 209 as Data source and Data destination.

E: INTRA MEMORY DMA 410: addresses memory 203 as data source (or data destination), and memory 206 on memory extension bus 209 as data destination (or data source).

F: C-BUS DMA 405: addresses memory 203 as data source (or data destination), and INTER MEMORY LINK ADAPTER 409 transmit buffer as data destination (or receive buffer as data source).

G: C-BUS DMA 405: addresses memory 206 on memory extension bus 209 as data source (or data destination), and inter memory link adapter 409 transmit buffer as data destination (or receive buffer as data source).

With reference to FIG. 20 showing the Memory Map, internal bus arrangement, interrupt preprocessor and Intra memory DMA, the detailed function of these will be described in the following. Central Processing Units on the P-bus 204 will to access memory via the P-bus send a P-bus request by taking the PREQ line corresponding to their Central Processing Unit number low, thereby notifying P-bus arbitrator 212, which will select one of the Central Processing Units by indicating its number in the 3 bit PGR word to selector 901. Direct memory access controllers on the C-bus requiring access to the C-bus, similarly takes down C-REQ line corresponding their DMA number to the C-bus arbitrator 213, which selects one by indicating the corresponding number in the 3 bit CGR word to selector 901. It is seen that the INTRA MEMORY DMA 410 is treated as Direct Memory Access controller number 0 on the C-bus 205, though it is operatively connected to the internal bus 215. Further the P-bus arbitrator 212 as a result of at least one Central Processing Unit requesting access forwards the signal PR to controller 902 and C-bus arbitrator 213 forwards CR if any DMA devices requesting access. Controller 902 selects the P-bus or C-bus address sourcing device for access by setting P/C signal if P-bus device or resetting P/C if C-bus device, thereby through selector 901 selecting PGR or CGR respectively to the GRANT lines of the internal bus 215. Further controller 902 open bus isolator 209 by the OP signal (Open P-bus) if P/C set and bus isolator 210 by the OC signal (Open C-bus) if P/C reset, the data on the GRANT lines of internal bus 215 are now let out to the selected P-bus or C-bus to the selected requesting address sourcing device which on recognizing its device number, opens its address, data and control lines to the bus (P-bus or C-bus). The address from the selected device are now available on the internal bus 215 if a privileged read/write the PRIV line is high, and Privileged read/write decoder 903 based on the address (AD0–AD15), output select signals dependent on position of accessed location as follows:

1. SRM if address in segment RAM 460, segment RAM R/W I/F 904 performs the specified access.
2. MTR if address in MAP TRANSLATION RAM 468, translation RAM R/W I/F 905 performs the specified access.
3. IPR if address in Control Memory 445 of the interrupt preprocessor 446, interrupt preprocessor R/W I/F 906 performs the specified access.
4. EXT if address is control memory or control/status registers on the extension bus 207, EXT opens bus isolator 211 to the extension bus 207 for passing through address, signals and data from the internal bus 215.
5. CCR if address is control memory or control/status register on the C-bus 205, CCR opens bus isolator 210 for passing through address, signals and data from internal bus.

The controller 902 monitors signals on the internal bus, and on conclusion of the privileged read/write closes bus isolators 209, 210, 211 and the arbitration cycle is resumed.

If the selected device was not attempting a privileged read/write but a mapped data transfer (PRIV line low) the controller latches address lines AD10–AD15 (logical page no.) into latch 908 for addressing A0–A5 of MAP translation RAM 468, furthermore selector 903 dependent on P/C selects either the bus line P/D indicating if program or data is accessed from a Central Processing Unit or bus line R/W indicating if a read or write access from a direct memory access controller, the selected signal together with P/C itself, is combined with the 3 bit GRANT word to address the segment RAM 460 (A0–A4), the output addressing A6–11 of the MAP translation RAM 468 specifying the segment number. Output of the MAP translation RAM 468 being the physical page number D0–D13 which is stored by controller 902 into latch 909, and parity and access control bits D14–D17 which goes to the parity and access control circuit 910, this circuit if parity is in error, or a read or write access is attempted into a protected page, or absent page, will initiate an interrupt indicating cause being transmitted to interrupt receiver 911 and controller 902 terminates access.

If no page faults, the controller 902 set the HADD bus line, high impedancing the address AD10–19 bus transmitters of the address sourcing device on the P-bus or C-bus, the HADD line high also reverses the bidirectional bus drivers of bus isolator 209 or 210 for the AD10–AD19 lines on the bus of the selected device (P-bus or C-bus), the bus is now driven from latch 909 and contains the physical page number, and as addresses AD0–AD9 is not changed by logical to physical address translation, the bus of the address sourcing device actually are holding the complete physical address for access to memory FIG. 19, 203. The AD20–AD23 test circuit 912 opens bus isolator 211 if location of physical address is in the range 1–16M word of memory FIG. 19, 206 positioned on the memory extension bus 207, thereby passing the total 24 bit physical address to the memory extension bus 207. The controller 902 monitors signals on the internal bus, and on conclusion of the memory mapped transfer closes bus isolaters 209, 210, 211 and the arbitration cycle is resumed. The function of the interrupt preprocessor 446 is to preprocess all interrupts generated in the central processing unit system, thereby achieving that Central processing units are only actually interrupted in their processing by interrupts qualified as do so as described in the following. With reference to FIG. 20, the interrupt preprocessor 446 receives interrupts and associated interrupt receiver 911, interrupts CIRT originating from devices on the C-BUS 205, interrupts EIRT from the devices on the extension bus 207 and as previously described interrupts from parity and access control check 910. An interrupt vector is a 10 bit word, containing device number of device (or cause) originating the interrupt and priority of the interrupt. The interrupt preprocessor control memory 445 contains a location containing priority and mask bit for each of the executing central processing units, each interrupt vector arriving to interrupt receiver 911 is compared by the interrupt preprocessor 446 against above locations, containing the prioprity of the currently executing software process of each Central Processing Units, if priority of arriving interrupt vector greater than that of currently executing software process on one or more central processing unit not having mask bit set, the interrupt preprocessor 446 will interrupt one of these Central Processing units by the corresponding direct CPU notification line, from interrupt preprocessor 446 being interrupted the central processing unit fetches the interrupt vector by privileged read in control memory 445. If priority of received interrupt lower than that of any of the Central Processing units it is stored in control memory 445 until priority of the central processing units falls below that of the stored interrupt, whereafter Interrupt Preprocessor 446 interrupts selected Central Processing unit as previously described. The function of the Intra memory DMA circuit 410 is to move a block of contiguous data words from one part of central processing unit system memory to another part of central processing system memory. With continued reference to FIG. 20, the central processing units by privileged writes, stores, control blocks defining intramemory DMA transfers by intramemory DMA 410 in the control memory 445. An intra memory DMA control block, defining moving of up to 64K words, comprises: logical begin address in memory where data is to be moved from, logical begin address in memory where data is to be moved to and a word count indicating the size of the data block to be moved. Further the control block comprises two translation table lists defining the translation from logical to physical addresses, for the logical address space where the data words is to be moved from, and for the logical address space where said data words is to be moved to. The interrupt preprocessor 446 sets up a data block movement defined by the above control block in the following way: The interrupt preprocessor by transferring data words through register 913 and addressing the map translation RAM 468 through the intra memory DMA circuit 410 loads the above two translation lists of the control block into MAP translationRAM 468 in the read and write segments defined for the intra memory DMA. Further the interrupt preprocessor loads the logical begin addresses and word count into the Intra memory DMA circuit 410, which now be incrementing the begin addresses and using register 913 for intermidiate storage of data words during transfer, moves the data words from the one area to the other, on a word by word basis, each time decrementing the word count until zero, whereafter the interrupt preprocessor 446 is notified of the completed transfer of the data block.

PERIPHERAL CONTROLLER SYSTEM

With reference to FIGS. 21 and 22 the peripheral controller system will not be described. FIG. 21 shows an embodiment of the peripheral controller system according to the invention, typically incorporated in one crate (printed circuit card cage) being interfaced to memory extension busses via crate interface adapters (CIA). In FIG. 21 is shown N+1 peripheral processors each associated with a random access memory (RAM) and a switch adaptor, one peripheral processor and its associated components being shown in greater details in FIG. 22 for explaining the operation thereof.

The crate of FIG. 21 comprises A-Bus 601 and B-bus 602 interfaced to a respective memory extension bus via a crate interface adapter 603 and 604 respectively and being connected to separate power supplies 605 and 606 respectively. According to the invention each peripheral processor say 607 is connected directly to a three ported memory 608 one port thereof being connected to the A-Bus and another port being connected to the B-Bus. Also shown in FIG. 21 is a configuration control adapter 609 said control adapter being connected via a configuration bus to a configuration control processor to be described later. The said configuration control processor supervising the overall system receives state information from various modules and by way of example detects the power supplies 605 and 606 via lines PA and PB respectively, the respective control adapter and configuration bus. The configuration control processor also receives information from the central processor unit systems, this information being by way of example a message concerning data missing or being incorrect from ingoing telecommunication lines no. N. Such a message is mostly created by way of the application software and so handled by the configuration control processor that a select spare signal is transmitted to switch adapter 610 (no. N) said switch adapter comprising transistor switch means generally known in the art and being arranged in each buswire to disconnect the said telecommunication lines from peripheral processor no. N and connect these lines to the common spare peripheral processor no. N+1 when the select spare signal is received.

The arrangement just described according to the invention enhances the fault tolerance remarkably compared with known principles. The connectivity power is also enhanced in that the memory shown in FIG. 21 is compartmentalized so that a memory fraction is handed over to only one associated peripheral processor. It will be known that the great majority of processing in handling telecommunication data consist in interpretation of data and recognizion of the destination thereof. These functions can be performed by the peripheral processors due to the steady coopooration with the associated memory and without interferring with the central processing units, the preprocessed data afterwards stored in the memory being ready for transfer to e.g. another central processing unit system. The interpretation of telecommunication data comprises execution of extensive software programs associated with modern communication protocols. By loading programs associated with a specific communication protocol in the compartementalized memory of that peripheral processor servicing communication lines in accordance with said protocol a standardization of the input lines can be obtained. Furthermore it is important that, in case of the aforementioned switching to the peripheral processor no N+1 of a switch adapter, the memory of peripheral processor no. N+1 can be loaded with protocol programs corresponding with that of the faulty peripheral processor.

Referring to FIG. 22 further details concerning the peripheral processor will now be described. This figure shows fractions of the A-Bus, B-Bus, memory extension busses and crate interface adapters already described above. The memory 608 is seen to be connected to the A-bus and the B-bus via bus interfaces 611 and 612 respectively. Further is shown a configuration control register 613, a current limiter 614, a peripheral device 615, an interrupt controller 616, control/status registers 617 and diodes 618, 619.

Main control lines and data control lines are shown and the signal directions indicated by arrows. It will be understood that only components and lines necessary to explain concepts related to the features of the invention are shown and described below.

Attention should first be drawn to the configuration control register 613 said register being controlled in different ways to disable either of the A-bus and B-bus. If the configuration control processor detects a failure in the multiprocessor system of the memory extension bus connected to the A-bus said configuration control processor will issue a disable A signal DA to the configuration control register 613 causing the regulator to disconnect the A-bus interface 611 from the A-bus, apart from the hatchet fraction of the interface 611, said hatchet fraction and a similar fraction of the B-bus interface also being connected to inputs of the configuration control register 613 via lines da and db respectively. Besides disabling the A-bus interface the DA signal also oppresses the da signal. If not being overruled by the signals DA and DB the signals da and db respective controls the register 613 to enable or disable bus interface 611 or 612 that is the bus interface may be controlled by the central processing units themselves. It is seen from the drawing that interrupt signals from the interrupt controller 616 and data transfer to and from control/status register 617 neither are transmitted via a disabled bus interface. Thus, it is possible that either of two central processing unit systems have access to the memory 608 controlled by the central processing unit systems themselves or by a supervisor system. The actual situation is reflected in the control/status register 617, that is a central processing unit system being knowledged about the operation of the other central processing unit system, of actions of the configuration control processor and further about the operation of the peripheral processor 607. By way of example the register 617 keeping the result of a self-checking routine in the peripheral processor. If the switch adapter 610 (FIG. 21) is switched over from peripheral processor no. N to peripheral processor no N+1 the status registers of these peripheral processors will store the switching conditions so that either processing unit system knows where to fetch/convey data.

The N+1 redundancy of FIG. 21 combined with the switchable access to the memory 608 by two processing unit systems yields great improvements over the prior art systems as to connectivity and fault tolerance. To further entrance the reliablity the dual power supplies are connected as shown in FIG. 22. Dual power supplies are commonly connected to dissipating devices via diodes 618, 619 but without the current limiter 614 whereby a short circuit in one device cuts the overall crate (draws down both power supplies through diodes 618,614) of FIG. 21 down. This is obviated by means of the current limiter 674.

CONFIGURATION CONTROL PROCESSING

With reference to FIGS. 23 and 24, details concerning configuration control processing now be described. The explanation of FIG. 21 has already assumed the existence of a configuration control processor said processor being shown in FIG. 23.

The configuration control processor CCP 701 of FIG. 23 is a separate processing unit being connected partly to two or more central processing unit systems for receiving information and partly to a plurality, in the preferred embodiment max 64, of Crate configuration control adapters 702 shown in greater details in FIG. 34 via a configuration bus 703 said bus being also connected to a manual back up panel MBP 704. By including the above mentioned components is an enhancement of the overall performance of the multiprocessor computer system according to the invention obtained, in that a faulty multiprocessing unit system cannot cause an unintentional reconfiguration of the computer system, the function of the configuration control processor being fail safe due to the manual back up panel. The manual back up panel also carries monitoring the error displaying into effect. The following description of FIGS. 23 and 24 being by way of example in that other implementations of the configuration control processing being possible within the scope of the invention.

The CCP processor 701 is arranged to receive information from at least two processing unit systems about any deficiency in these systems and to make a decision about the need of disconnecting a fraction of the computer system. The information received by the CCP processor may be generated in several locations of a central processing unit system though it is preferred to connect the CCP processor to the interrupt preprocessor (14 FIG. 2) of the relevant central processing unit system via a respective line for duplex serial bit transfer. Any alterations may be read out on a log printer schematically shown in the drawing.

Via the serial configuration bus 703 control and monitoring of the attached crate configuration adapters is obtained by the CCP processor or the MBP controller utilizing alternative path 705, 706 of the bus 703. Only one path is active at a time, the active path being determined automatically or manually be cooperating selector means in the CCP processor and in the MBP controller. The selector means in the CCP processor comprises a one shot 707 driving a switch 708 serial connected in the solenoid of a relay controlling switches 709, 710. The selector means of the MBP controller comprises a manual switch 711 and a switch 712 driven by a relay the solenoid, of which being energized via the switches 709, 711. As indicated in the drawing, each of the switches 710 and 712 actually being a set of switches interconnected in a respective one of a plurality of wires constituting each path 706 or 705. When the switch 711 is in the auto position, as shown, and assuming that the switch 708 is closed, the said solenoids will be energized by a +5 V supply connected to the switch 711. The switch 708 is controlled by the one shot 707 to be closed as far as the one shot 707 is retriggered within a predetermined period of time. The one shot is triggered only when a repeatedly selfchecking routine in the CCP processor has confirmed correct operation, that is the switch 708 will be opened if a failure in the CCP processor is detected. Opening of the switch 708 causes the relay in the CCP processor to be deactivated, whereby on the one hand the path 706 will be disconnected by switch 710 and on the other hand the relay in the MBP controller will be deactivated, causing the switch 712 to connect the path 705, resulting the crate configuration adapters to be handed over from the CCP processor to the MBP controller.

The manual back up panel controller 704 comprises a plurality of switches 713 manually setable to define a preselected configuration of the overall system. Also incorporated in the MBP controller is scanning means (not shown) arranged to scan the positions of the said switches for immediate read out corresponding configuration information to the crate configuration adapters 702 upon closing of the switch 712. The switch 711 being manually operated too, overrides in the man. position the function of the one shot 707 to hand the crate configuration adapters over to the control of the MBP controller. This is an expedient feature when disconnecting the CCP processor for repair. The setting of the switch 711 into man. position will be detected by the interrupt preprocessors being sensitive to the trailing edge of the +5 V signal.

With reference to FIG. 24 is shown a preferred embodiment of the crate configuration adapter 702 schematically connected to the configuration bus 703 of FIG. 23. Apart from wires not important to the following description, the path 706 of the configuration bus 703 is seen to comprise five wires, two wires for serial receiving signals by the crate configuration adapter, and three wires for serial transmitting signals from the crate configuration adapter. The received signals are generated by a bus transmitter 720 located in the CCP processor and transmitted to a serial transceiver 721 in the crate configuration adapter via an opto coupler 722. Signals are transmitted from the serial transceiver 721 via an opto coupler 723 energized from one of the three wires to the remaining two wires connected to a bus receiver 724 located in the CCP processor. The said bus transmitter, bus receiver and opto couplers are conventional in the art and will not be further described. Attention ought to be drawn to the resulting galvanic isolation of the configuration bus from each crate configuration adapter. It will be understood that the opto couplers 725 and 726 are being connected to respective wires of the path 705.

The control signals received by the serial transceiver 721 via a conventional wired or circuit are translated to a plurality of output wires shown at the right hand side of FIG. 24. The uppermost five wires may by way of example constitute the select spare bus shown in FIG. 21 to select one of max sixteen switch adapters 610 to be disconnected from an associated peripheral processor and connected to the common spare peripheral processor when switch enable is raised. Other outgoing wires may be designated as the wires DA, DB of FIG. 22 for disabling either of the A-bus interface 611 or the B-bus interface 612 a total of 34 wires being necessary to control max. sixteen plus one, compartmentalized memories 608. Other outgoing wires may be connected to the transceivers 312, 313 of the intermemory link adapters of FIG. 10 for disabling said link adapters. The crate configuration adapter being also arranged to receive check signals and to transmit these signals to the configuration bus. By way of example an on/off signal being produced by a pressostate and indicating pressure difference of a cooling fan may be directly fed to the serial transceiver 721, while analog signals may be received via A/D converter and multiplexer 727. Examples of analog lines are the lines PA, PB (FIG. 21) for detecting voltage and/or current of the power supply, and further lines might be arranged for testing crate temperatures, etc. The check signals are transmitted by the serial transceiver 721 via a conventional driver to the configuration control processor for interpretation, if switch 710 is closed. If, however, switch 712 is closed no action may be taken apart from displaying the condition.

A few examples of the function of the configuration control processor will now be given. Assuming that a central processing unit system by its selfchecking routines reveals a failure, a message will be sent via the interrupt preprocessor of that unit system to the related configuration control processor having programs and tables for analysing the message to decide for partly or totally disconnect that central processing unit system from the multiprocessor computer system. If it is decided only to disconnect the central processing unit system from the intermemory communication network, the configuration control processor will issue a message addressed to the crate configuration adapter in question and instructing the configuration adapter to disconnect all link adapters (FIG. 10) by disabling the respective transceivers. If the central processing unit system should be totally disconnected, a message would also be produced by the configuration control processor instructing the crate configuration adapter in question to rise, e.g. the signal DA (FIG. 22) of every compartmentalized memory for totally disconnecting the A-bus of the failed central processing unit system. As another example the protocol of a central processing unit could reveal of failure in an peripheral processor, say 607 FIG. 21. This would cause the configuration control processor to instruct the relevant crate configuration adapter issue the address of the switch adapter 610 via the select spare bus together with the switch enable signal for switching the switch adapter over to the common spare peripheral processor as previously explained with reference to FIG. 21. The communication between the crate configuration adapters and the configuration control processor common to said adapters being preferably established in two modes. In the sending mode the CCP processor issues two bytes, the first byte being the crate address of the crate configuration adapter in question and the second byte defining the instructions to be sent out by the crate configuration adapter. In the receiving mode the CCP processor also issues two bytes, the first byte being the crate address of the crate configuration adapter in question and the second byte identifies a combination of ingoing signals to the serial transceiver 721 to be carried over to the CCP processor for monitoring. Thereby the CCP processor can supervise specific conditions in the overall system, e.g. the voltage of the power supplies.

Alternatively, the configuration control processing could be executed by a central processing unit system of the kind described, said configuration processing unit system being interconnected with the other central processing units of the multiprocessor computer system via the intermemory communication network.

What I claim is:

1. A multiprocessing computer system comprising:
   (A) a plurality of central processing systems, each system including
      (a) at least one central processing unit for processing data in response to instructions and having the capability to produce address source information,
      (b) memory means for storing data,
      (c) bus means for transferring data between said at least one central processing unit and said memory means,
      (d) intermemory link adaptor means connected to said bus means for transporting data externally of said central processing system; and
      (e) DMA means associated with said intermemory link adaptor means for producing address source information and for controlling transfers of data via said intermemory link adaptor means and said bus means to and from said memory means without intervention by said at least one central processor unit,
   (B) at least a portion of said memory means defining a common memory having separate port means for connecting via respective bus means at least two of said plurality of central processing systems, said separate port means causing said common memory to be shared by the two central processing systems;

(C) at least part of said common memory being compartmentalized and divided into a number of separate memory compartments wherein each of said memory compartments is coupled to a respective data transfer port and to said respective bus means of at least two of said plurality of central processing systems;

(D) at least one peripheral device controller means associated with at least one of said plurality of central processing systems and being adapted for connection with a peripheral device, each said peripheral device controller means being connected to a preselected memory compartment of said common memory via the data transfer port associated with said preselected memory compartment, said peripheral device controller means having means for producing and means for responding to address source information and means for controlling the transfer data between said peripheral device and the preselected memory compartment of said common memory;

(E) an intermemory communication network comprising a plurality of intermemory link means for connection with said intermemory link adaptor means of said plurality of central processing systems and for transferring data among said memory means of respective ones of said plurality of central processing systems; and (F) DMA interface controller means connected to said intermemory communication network via said intermemory link adaptor means, said DMA interface controller means for controlling access to said memory of each of said plurality of central processing systems via said DMA means, said DMA interface controller means multiplexing transfers of data over said intermemory communication network, said DMA interface controller means being further operative to effect logical connection of at least two intermemory link adaptor means of respective ones of said central processing systems to said intermemory communication network in response to said address source information and to multiplex transfers of data among said memory means of the respective central processing systems over said intermemory communication network without intervention by said associated central processing unit.

2. The multiprocessing computer system as recited in claim 1, wherein at least two of said bus means do not interface with each other but do interface with another bus means via said intermemory communication network.

3. The multiprocessing computer system as recited in claim 1, wherein at least two of said plurality of central processing systems are connected in parallel with respect to said intermemory link adaptor means.

4. The multiprocessing computer system as recited in claim 1, wherein said plurality of central processing means are connected in a series array with respect to said intermemory link adaptor means.

5. The multiprocessing computer system as recited in claim 1, wherein at least one of said central processing systems includes at least two independently operating central processing units.

6. The multiprocessing computer system as recited in claim 1, wherein said intermemory link adaptor means includes arbitration means for operatively connecting said link adaptor means to an intermemory link to control contention and transfers of data over said intermemory communication network.

7. The multiprocessing computer system as recited in claim 1, wherein the compartmentalized common memory includes a spare memory compartment, and wherein said multiprocessing computer system further comprises:

at least one spare peripheral device controller means for connection with said bus means of said at least one of said central processing systems through said spare memory compartment;

configuration control processor means for monitoring failures in a group of components including said memory compartments and said peripheral device controllers and for generating reconfiguration information in response to a failure therein; and configuration adaptor means responsive to said reconfiguration information for substituting said spare peripheral device controller means and the respective spare memory compartment in place of a failed peripheral device controller memory and its memory compartment.

8. The multiprocessing computer system as recited in claim 7, wherein said intermemory link adaptor means comprises enabling/disabling means connected to a respective configuration adaptor means, said configuration adaptor means being effective to disconnect the bus means from said intermemory link adaptor means.

9. The multiprocessing computer system as recited in claim 7, further comprising bus separators wherein at least part of said memory means is addressable by said address source information and is connected to said bus means of said at least one central processing system via separate bus separators, each part of said memory means being enabled or disabled by said configuration adaptor means.

10. The multiprocessing computer system as recited in claim 9, wherein the respective parts of said memory means are individually powered by at least two power supplies.

11. The multiprocessing computer system as recited in claim 7, wherein said configuration adaptor means includes a configuration bus for transferring said configuration information which is electrically isolated from said configuration adaptor means.

12. The multiprocessing computer system as recited in claim 7, wherein said configuration adaptor means further comprises input means for receiving information from detector means distributed throughout said multiprocessing computer system for monitoring operating conditions and detecting faults in said multiprocessing computer system, said input means being accessible via said configuration adaptor means and via said configuration bus by a configuration control processor for monitoring operating conditions and faults and for generating reconfiguration information in response thereto.

13. The multiprocessing computer system as recited in claim 12, wherein the conditions being monitored include voltage, current, and temperature in at least one portion of said multiprocessing computer system.

14. The multiprocessing computer system as recited in claim 7, further comprising a back-up controller connected to said configuration bus, said configuration bus having redundant paths separately connected to said configuration control processor means and to said back-up controller, and switching means responsive to a malfunction of said configuration control processor means for alternately enabling one of said paths while disabling the other of said paths.

15. The multiprocessing computer system as recited in claim 14, wherein said back-up controller comprises:
a plurality of manually setable switches, the positions thereof defining a predetermined configuration of said multiprocessing computer system representative of said configuration information, and
scanning means for scanning the positions of said switches and to transfer corresponding configuration information to a respective configuration bus through an enabled path thereof.

16. The multiprocessing computer system as recited in claim 14, wherein said back-up controller comprises a manually setable switch overriding said switching means.

17. The multiprocessing computer system as recited in claim 7, wherein a number of said peripheral device controller means is arranged to address only one respective compartment of the compartmentalized common memory means, the respective memory compartments being separately and operatively connected to said bus means of said at least one central processing system, said multiprocessor computer system further comprising:
a plurality of switchover modules, the number of switchover modules being one less than the said number of peripheral device controller means, and each of said plurality of switchover modules being controlled by a respective one of said configuration adaptor means,
a plurality of peripheral devices connected via respective switchover modules to said number of peripheral device controller means but one of said peripheral devices when said switchover modules are arranged in a first position, and
a spare peripheral device controller means connected to said one of said peripheral devices via a respective switchover module when said module is arranged in a second position.

18. In a multiprocessing computer system, a central processing system comprising:
a plurality of central processing units processing data in response to instructions and having means for producing address source information,
memory means for storing data,
a plurality of address sourcing devices other than said plurality of central processing units producing address source information for transferring and storing data,
first bus means associated with said plurality of central processing units and with a first portion of said memory means for transferring data among said plurality of central processing units and said memory means along a first memory path,
second bus means for connecting said plurality of address sourcing devices along a second memory path to said first portion of said memory means, and for connecting said at least one central processing unit and at least one of said plurality of said address sourcing devices along a third common extension path to a second portion of said memory means, said first and second memory paths enabling said at least one central processing unit and said at least one address sourcing devices to access said first portion of said memory means without contention, and being effective to reduce contention among each other when accessing said second portion of said memory means,
intermemory link adaptor means connected to said second bus means for transferring data externally of said central processing system to and from the memory means of selected ones of said plurality of central processing systems, and
DMA interface controller means cooperating with the producer of said address source information for controlling external transfers of data via said intermemory link adaptor means, so as to provide decreased contention between respective memory means in said central processing system and in the external central processing system.

19. In the multiprocessing computer system recited in claim 18, including a plurality of central processing systems, an intermemory communication network to which said plurality of central processing systems connect for transferring data among their respective memory means via respective intermemory link adaptor means, at least two specified central processing systems of said plurality of central processing system transferring data in the form of a data stream controlled by said DMA interface controller means, and wherein one respective intermemory link adaptor means of one of said specified central processing systems includes a transmitting buffer established for a specified data stream only and the other respective intermemory link adaptor means of the other specified central processing system includes a receiving buffer established for receiving the said data stream only.

20. In the multiprocessing computer system as recited in claim 19, wherein said DMA interface controller means in each central processing system comprises:
means for generating and responding to a request signal transmitted via said intermemory communication network from one of said central processing systems to another one thereof for establishing a data stream specified by a data transfer request,
interrupt means responsive to said request signal for interrupting the respective central processing system and to generate a stream descriptor defining transfer parameters including free memory space for the storage of data to be transferred by said data stream,
a local control memory associated with said DMA interface controller means for containing a plurality of active stream descriptors, and
interleave means for interleaving transfers of data in accordance with parameters defined by a number of stream descriptors contained in said local control memory.

21. In a multiprocessing computer system as recited in claim 20, wherein said interrupt means responds to the termination of the transfer of the data stream by interrupting the respective central processing system to delete the related stream descriptor contained in said local control memory thereby disengaging the memory space allocated in conjunction with a stream descriptor.

22. In a multiprocessing computer system as recited in claim 19, wherein said DMA interface controller means further comprises speed control means for controlling the rate of transfer of each transferred data stream into said intermemory communication network from respective buffers of respective memory means being specified as a source, thereby ensuring a specified rate of transfer of each of said data streams independently of other data streams into the intermemory communication network and independently of a central processing means.

23. In a multiprocessing computer system as recited in claim 22, wherein said speed control means comprises:
   a memory containing an address location defining an entry for each data stream to be transferred, said entries being ordered in groups according to the specified data transfer rates,
   scanning means for scanning said entries in one data transfer group at twice the rate of entries in a successive data transfer rate group, and wherein said scanning means performs a fixed number of scans of each entry in the highest data transfer rate group within a specified time period, and
   wherein each entry upon being accessed by said scanning means is utilized for initiating a transfer of one data block being part of a data stream and is specified by said DMA interface controller means.

24. A central processing system comprising:
   at least one central processing unit having means for processing data in response to instructions and having means for producing address source information, memory means for storing data, bus means interconnecting said memory means and said central process unit, one or more address sourcing devices in addition to said central processing unit including means for controlling transfers of data therebetween on said bus means without intervention by said central processing unit,
   at least one group of N+1 peripheral processors, each peripheral processor of said one group arranged to address a respective memory compartment within said memory means, the memory compartments being operatively connected to said bus means,
   said central processing system including means for detecting failure of one of said N+1 peripheral processors,
   a plurality of N controlled switchover modules, a respective switchover module corresponding to respective peripheral processors except peripheral processor N+1, said switchover modules being responsive to said means for detecting failure,
   a plurality of peripheral devices connected respectively via N switchover modules to N peripheral processors when said switchover modules are arranged in a first position, said peripheral processor N+1 not being connected to one of said plurality of peripheral devices when said switchover modules are in said first position, and
   said N+1 peripheral processor being connected to the peripheral devices connected to a preselected one of said switchover modules when the preselected switchover module is arranged in a second position.

25. A central processing system as recited in claim 24, wherein each memory compartment in said memory means is connected to the bus means via operatively controlled first bus separators, and
   wherein one or more of said memory compartments is further connected to said bus means of another central processing system via operatively controlled second bus separators.

26. An intermemory communication system for providing redundant communication and transfer of data between memories of at least two computer systems, each computer system having at least one central processing unit means for processing data in response to instructions and memory means for storing programs and data, the intermemory communication system comprising:
   a plurality of intermemory link means for interconnecting respective memories as part of respective said computer systems, each intermemory link including at least two cables, a plurality of link adaptors for interfacing respective memory means of each of said computer systems, each link adaptor having a pair of tapping means for coupling to one of said intermemory links, one respective tap coupled to one cable of a respective intermemory link, each link adaptor including a receive buffer and a transmit buffer, said transmit buffer including means for indicating a busy status when data are presently stored therein and means for indicating a free status when data have been transferred to an intermemory link, and wherein each link adaptor has arbitrating control means effective to arbitrate the use of an intermemory link common to a plurality of link adaptors, and
   DMA interface controller means initiated by a central processing unit in a respective computer system for operatively connecting and transferring a number of data blocks via selected link adaptors and said intermemory link to a preselected computer system defined as a destination computer system without interfering with the central processing units of said respective computer system and said preselected computer system, said DMA interface controller means having means for transferring said number of data blocks to a selected free transmit buffer of a link adaptor operatively connected to the corresponding link adaptor of the destination computer system via a first intermemory link adaptor and being effective to repetitively select another free transmit buffer of a link adaptor being operatively connected to said destination computer system via a different intermemory link until a confirming message has been received from the DMA interface controller means of the destination computer system indicating that the number of data blocks is received valid within a predetermined time period after the transfer of the data blocks to a selected transmit buffer.

27. An intermemory communication system as recited in claim 26, wherein each intermemory link connected to a respective link adaptor including arbitrating control means, respective cables in each said intermemory link defining a transfer path and a respond path, said arbitrating control means comprising:
   detector means for producing an idle signal when the transfer path of a respective intermemory link is idle,
   delay means enabled when the respective transmit buffer is busy via the busy indicating means, said delay means being responsive to the idle signal to initiate a transfer from said transmit buffer over said transfer path at a pseudorandom period of time after the occurrence of each idle signal,
   responding means being effective to direct the data received via the respective transfer path from another link adaptor back to that other link adaptor via the corresponding respond path, and
   comparison means for comparing data received via the respond path and data transmitted from the transmit buffer over the corresponding transfer path and being effective to cut off the transfer of data if the compared data are unequal, and to disable said delay means if the compared data are equal.

28. An intermemory communication system as recited in claim 27, wherein said responding means only directs data received via the respective transfer path from another link adaptor path back to that other link adaptor via the corresponding respond path if the receive buffer corresponding to said responding means is ready to receive data.

29. An intermemory communication system as recited in claim 27, wherein said transfer path and said respond path correspond to respective cables for serial bit transmission over said intermemory link.

30. A intermemory communication system as recited in claim 26, wherein each link adaptor electrically senses signals on the intermemory link but is otherwise electrically and mechanically isolated from said intermemory link comprising said intermemory communication network.

* * * * *